(12) United States Patent
Cheng et al.

(10) Patent No.: US 10,380,243 B2
(45) Date of Patent: Aug. 13, 2019

(54) PARALLEL-TRANSLATION DICTIONARY CREATING APPARATUS AND METHOD

(71) Applicant: FUJITSU LIMITED, Kawasaki-shi, Kanagawa (JP)

(72) Inventors: Yuchang Cheng, Kawasaki (JP); Nobuyuki Katae, Kawasaki (JP); Tomoki Nagase, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 119 days.

(21) Appl. No.: 15/624,306

(22) Filed: Jun. 15, 2017

(65) Prior Publication Data

US 2018/0018317 A1    Jan. 18, 2018

(30) Foreign Application Priority Data

Jul. 14, 2016 (JP) ................................. 2016-139356

(51) Int. Cl.
*G06F 17/27* (2006.01)
*G06F 17/28* (2006.01)

(52) U.S. Cl.
CPC ...... *G06F 17/2735* (2013.01); *G06F 17/2755* (2013.01); *G06F 17/2785* (2013.01); *G06F 17/2836* (2013.01)

(58) Field of Classification Search
None
See application file for complete search history.

(56) References Cited

U.S. PATENT DOCUMENTS

| 6,085,162 A * | 7/2000 | Cherny ............... G06F 17/2735 704/2 |
| 7,295,963 B2 * | 11/2007 | Richardson ......... G06F 17/2836 704/2 |
| 8,412,513 B2 * | 4/2013 | Anisimovich ...... G06F 17/2755 704/2 |

(Continued)

OTHER PUBLICATIONS

Liu, Xiaodong, Kevin Duh, and Yuji Matsumoto."Multilingual Topic Models for Bilingual Dictionary Extraction." ACM Transactions on Asian and Low-resource Language Information Processing 14.3 (2015): 11. (Year: 2015).*

(Continued)

*Primary Examiner* — Jonathan C Kim
(74) *Attorney, Agent, or Firm* — Fujitsu Patent Center

(57) ABSTRACT

A parallel-translation dictionary creating apparatus that includes a processor configured to create a parallel-translation dictionary; the processor extracts words from each of the plurality of documents; performs an estimation and storage of a semantic classification of the extracted words; based on a result of the estimation of the semantic classification for the word in the document that is a current processing target and the word pair registered in the parallel-translation word list; updates, to the semantic classification of the word for which the semantic classification has been estimated, the semantic classification of a corresponding word that corresponds to the word and to the subject matter of the document that is the current processing target; and creates the parallel-translation dictionary based on the semantic classification of the word obtained by the estimation of the semantic classification of the word and the update of the semantic classification of the corresponding word.

16 Claims, 31 Drawing Sheets

(56) References Cited

U.S. PATENT DOCUMENTS

| | | | | |
|---|---|---|---|---|
| 9,047,275 B2* | 6/2015 | Parfentieva | G06F 17/2881 | |
| 9,189,482 B2* | 11/2015 | Danielyan | G06F 17/2755 | |
| 9,235,573 B2* | 1/2016 | Danielyan | G06F 17/2755 | |
| 9,633,005 B2* | 4/2017 | Danielyan | G06F 17/271 | |
| 9,740,682 B2* | 8/2017 | Zuev | G06F 16/36 | |
| 2006/0282255 A1* | 12/2006 | Lu | G06F 17/2827 | 704/2 |
| 2007/0203691 A1* | 8/2007 | Okura | G06F 17/289 | 704/3 |
| 2008/0162115 A1* | 7/2008 | Fuji | G06F 17/2827 | 704/7 |
| 2009/0070099 A1* | 3/2009 | Anisimovich | G06F 17/2755 | 704/5 |
| 2009/0182549 A1* | 7/2009 | Anisimovich | G06F 17/2755 | 704/4 |
| 2010/0070521 A1* | 3/2010 | Clinchant | G06F 16/3337 | 707/760 |
| 2011/0202334 A1* | 8/2011 | Abir | G06F 17/2809 | 704/4 |
| 2012/0239378 A1* | 9/2012 | Parfentieva | G06F 17/2785 | 704/4 |
| 2013/0054612 A1* | 2/2013 | Danielyan | G06F 17/2755 | 707/741 |
| 2013/0262077 A1* | 10/2013 | Fuji | G06F 17/28 | 704/2 |
| 2014/0101171 A1* | 4/2014 | Danielyan | G06F 17/2755 | 707/749 |
| 2014/0129212 A1* | 5/2014 | Danielyan | G06F 17/2755 | 704/9 |
| 2014/0297253 A1* | 10/2014 | Nagase | G06F 17/2854 | 704/2 |
| 2015/0178271 A1* | 6/2015 | Selegey | G06F 17/2827 | 704/9 |
| 2015/0278197 A1* | 10/2015 | Bogdanova | G06F 17/2785 | 704/9 |
| 2015/0331855 A1* | 11/2015 | Rylov | G06F 17/28 | 704/2 |
| 2016/0350288 A1* | 12/2016 | Wick | G06F 17/2735 | |

OTHER PUBLICATIONS

Chu, Chenhui, Toshiaki Nakazawa, and Sadao Kurohashi. "Iterative bilingual lexicon extraction from comparable corpora with topical and contextual knowledge." International Conference on Intelligent Text Processing and Computational Linguistics. Springer, Berlin,Heidelberg, 2014. (Year: 2014).*

Vulić, Ivan, et al. "Probabilistic topic modeling in multilingual settings: an overview of its methodology and applications." Information Processing & Management 51.1 (2015): 111-147. (Year: 2015).*

Daniel Andrade et al., "Effective Use of Dependency Structure for Bilingual Lexicon Creation", In Alexander Gelbukh (Ed.), Computational Linguistics and Intelligent Text Processing: 12th International Conference, CICLing 2011, Tokyo, Japan, Feb. 20-26, 2011. Proceedings, Part II, pp. 80-92, (13 pages).

Xiaodong Liu et al., "Multilingual Topic Models for Bilingual Dictionary Extraction", ACM Trans. Asian Low-Resour. Lang. Inf. Process., vol. 14, No. 3, Article 11, Jun. 2015 (22 pages).

* cited by examiner

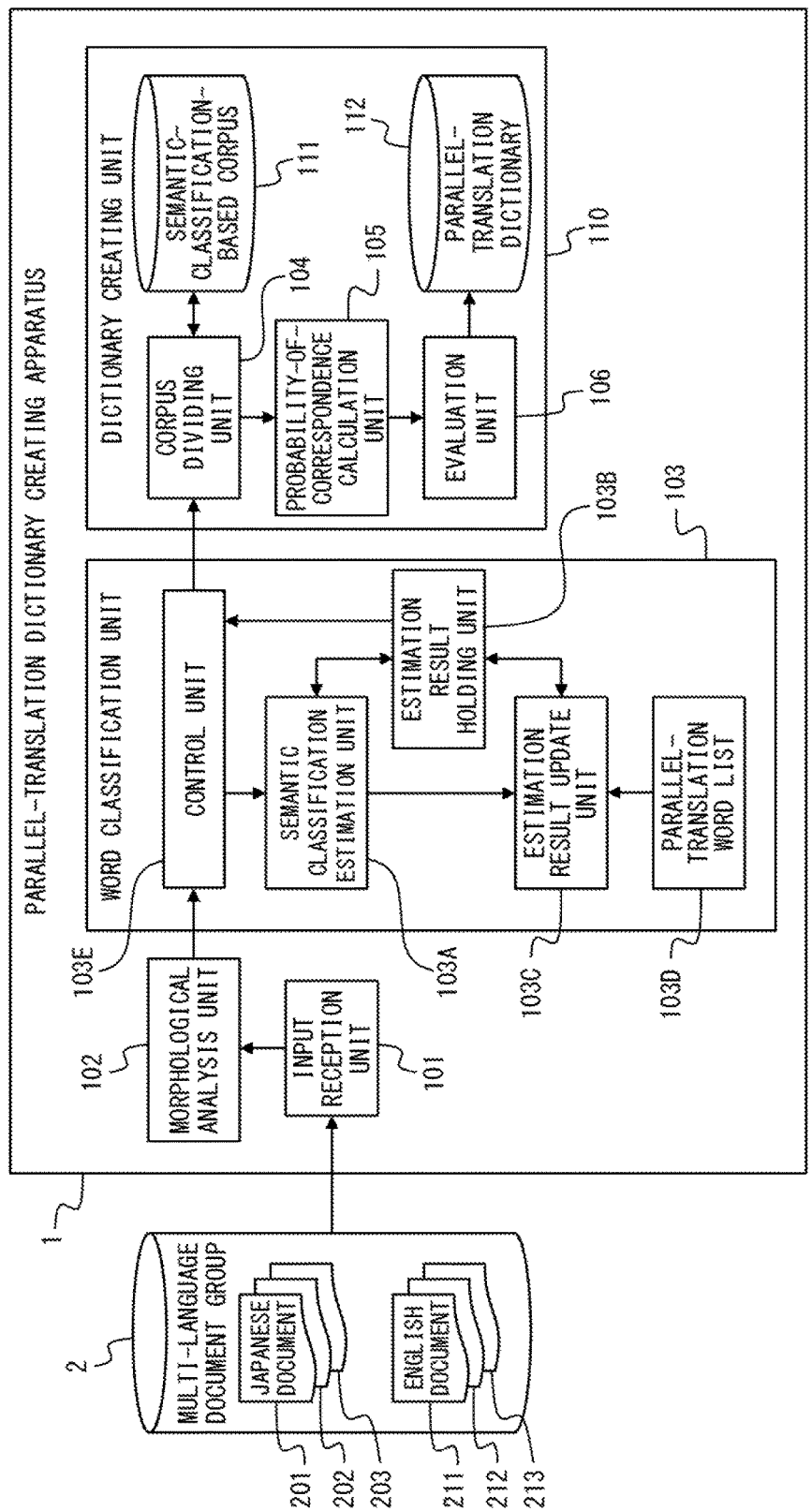
F I G. 1

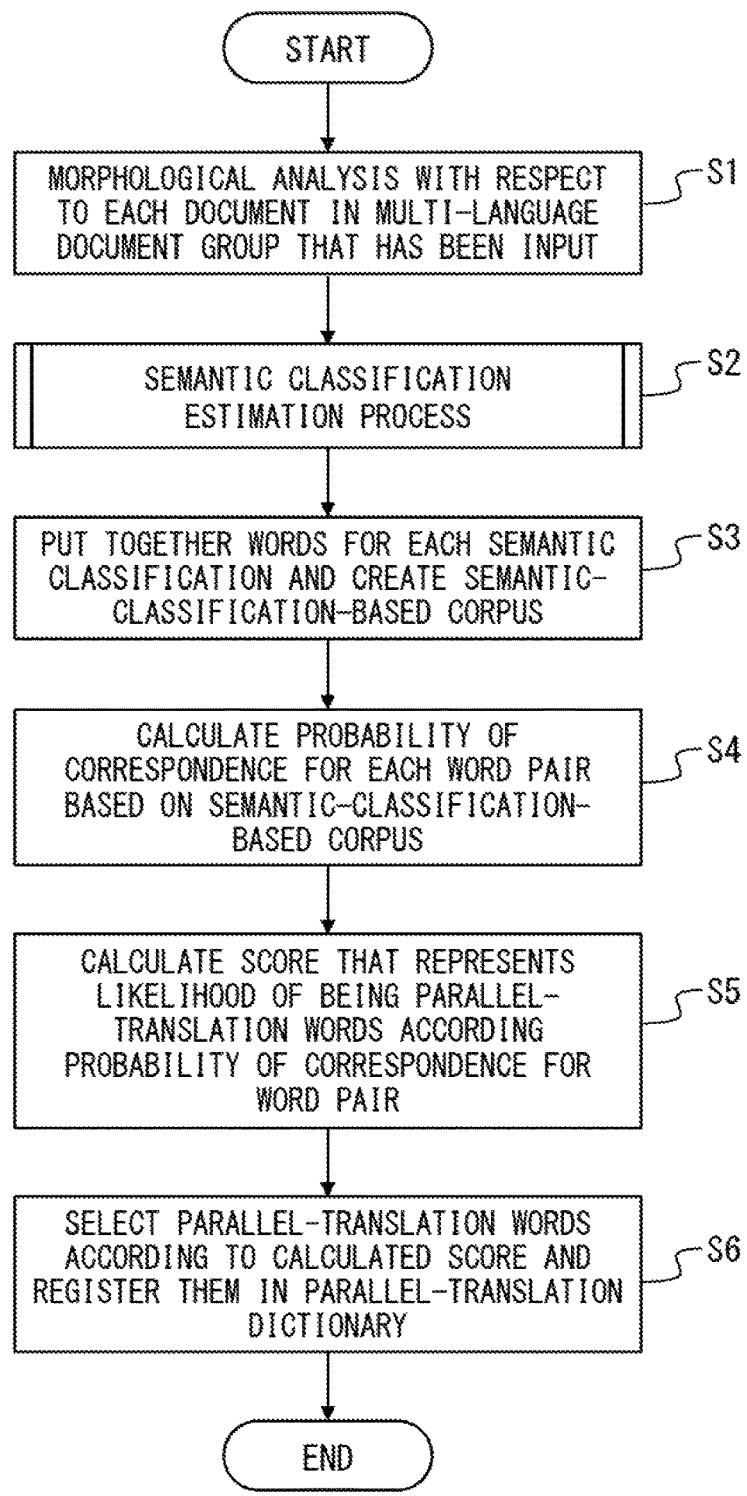
F I G. 2

| NUMBER OF PROCESSES | ESTIMATION RESULT | | |
|---|---|---|---|
| | W11 | W12 | W13 |
| 1 | T1 (SUMO) | T1 | T2 (POLITICS) |
| 2 | T3 (IMMIGRATION) | T4 (MILITARY) | T4 |
| 3 | T5 (CELEBRITIES) | T5 | T4 |
| 4 | T1 | T2 | T2 |
| 5 | T6 (TOKUSHIMA) | T6 | T2 |
| ⋮ | ⋮ | ⋮ | ⋮ |

401

| WORD | PROBABILITY DISTRIBUTION | | | | |
|---|---|---|---|---|---|
| | T1 | T3 | T2 | T4 | ... |
| W11 | 0.4 | 0.1 | 0.05 | 0.2 | ... |
| W12 | 0.2 | 0.2 | 0.3 | 0.1 | ... |
| W13 | 0.01 | 0.3 | 0.3 | 0.1 | ... |

| | ESTIMATION RESULT FOR JAPANESE DOCUMENT 403 | | | ESTIMATION RESULT FOR ENGLISH DOCUMENT 404 | | | 103D | |
|---|---|---|---|---|---|---|---|---|
| | W11 | W12 | W13 | W21 | W22 | W23 | JAPANESE | ENGLISH |
| 1 | T1 | T2 | T2 | T1 | T1 | T4 | W11 | W21 |
| 2 | T3 | T4 | T4 | | | | | |

FIG. 6B

| | ESTIMATION RESULT FOR JAPANESE DOCUMENT 403 | | | ESTIMATION RESULT FOR ENGLISH DOCUMENT 405 | | | 103D | |
|---|---|---|---|---|---|---|---|---|
| | W11 | W12 | W13 | W21 | W22 | W23 | JAPANESE | ENGLISH |
| 1 | T1 | T1 | T2 | T1 | T1 | T4 | W11 | W21 |
| 2 | T3 | T4 | T4 | T1 | | | | |

FIG. 6C

Estimation Result for Japanese Document (406):

| | W11 | W12 | W13 |
|---|---|---|---|
| 1 | T1 | T1 | T2 |
| 2 | T1 | T4 | T4 |

Estimation Result for English Document (407):

| | W21 | w22 | W23 |
|---|---|---|---|
| 1 | T1 | T1 | T4 |
| 2 | T1 | T2 | T2 |

103D:

| JAPANESE | ENGLISH |
|---|---|
| W11 | W21 |

FIG. 6D

Estimation Result for Japanese Document (408):

| | W11 | W12 | W13 |
|---|---|---|---|
| 1 | T1 | T1 | T2 |
| 2 | T1 | T4 | T4 |
| 3 | T5 | T5 | T4 |

Estimation Result for English Document (409):

| | W21 | W22 | W23 |
|---|---|---|---|
| 1 | T1 | T1 | T4 |
| 2 | T1 | T2 | T2 |
| 3 | T1 | | |

103D:

| JAPANESE | ENGLISH |
|---|---|
| W11 | W21 |

| | ESTIMATION RESULT FOR JAPANESE DOCUMENT | | | |
|---|---|---|---|---|
| | | W11 | W12 | W13 |
| 1 | | T1 | T1 | T2 |
| 2 | | T1 | T4 | T4 |
| 3 | | T1 | T4 | T4 |

410

| | ESTIMATION RESULT FOR ENGLISH DOCUMENT | | | |
|---|---|---|---|---|
| | | W21 | W22 | W23 |
| 1 | | T1 | T1 | T4 |
| 2 | | T1 | T2 | T2 |
| 3 | | T1 | T2 | T4 |

411

| | JAPANESE | ENGLISH |
|---|---|---|
| 1 | W11 | W21 |

| NUMBER OF PROCESSES | ESTIMATION RESULT FOR JAPANESE DOCUMENT | | |
|---|---|---|---|
| | W11 (白王) | W12 (モンゴル) | W13 (アメリカ) |
| 1 | T1 | T1 | T2 |
| 2 | T1 | T4 | T4 |
| 3 | T1 | T1 | T4 |
| 4 | T1 | T2 | T2 |
| 5 | T1 | T1 | T2 |
| ⋮ | ⋮ | ⋮ | ⋮ |

412

F I G. 7 A

| WORD | PROBABILITY DISTRIBUTION | | | | |
|---|---|---|---|---|---|
| | T1 | T3 | T2 | T4 | ··· |
| W11 | 0.9 | 0.01 | 0.001 | 0.01 | ··· |
| W12 | 0.4 | 0.18 | 0.22 | 0.1 | ··· |
| W13 | 0.03 | 0.28 | 0.28 | 0.1 | ··· |

MULTI-LANGUAGE DOCUMENT GROUP

2

21
201: アメリカで高い人気を持つ、次期大統領候補にもなったラリー・クラプトン氏は、春賀富士は、横綱・白王に負けた横綱・春賀富士と、17日、両国国技館でアメリカ相撲協会の設立について会談を行った。
211: arity in the United linton, who is also the dacy, Yokozuna Hakuho in the Yokozuna, and Yokozuna ment. 17 days. for the the United States Sumo both countries Kokugikan Association in both countries talks were carried out.

22
202: アメリカの議会は、相撲協会の設立予算を審査するため、横綱・春賀富士を参考人として招待し、春賀富士はそのため、秋場所を欠場した。
212: , to review the et of the Sumo ted Yokozuna Harukafuji umafuji because that was 23
203: 白王、朝雄龍、春賀富士などの力士を輩出したモンゴルでは、17日、議会で次期駐日大使の人選を承認。
213: , a Mongolian sumo ced, such as Harukafuji ed the appointment of the next Ambassador to Japan in Congress.

| DOCUMENT PAIR NUMBER | WORDS EXTRACTED BY MORPHOLOGICAL ANALYSIS ||
| --- | --- | --- |
| | WORDS OF JAPANESE DOCUMENT | WORDS OF ENGLISH DOCUMENT |
| 1 | アメリカ<br>負け<br>選挙<br>白王<br>両国国技館<br>・・・ | Hakuoh<br>lose<br>Harukafuji<br>U.S.<br>whitehouse<br>Congress<br>・・・ |
| 2 | アメリカ<br>予算<br>議会<br>春賀富士<br>欠場<br>秋場所<br>・・・ | U.S.<br>whitehouse<br>Congress<br>Harukafuji<br>Yokozuna<br>・・・ |
| 3 | 議会<br>承認<br>大使<br>白王<br>春賀富士<br>モンゴル<br>・・・ | Hakuoh<br>Harukafuji<br>Ambassador<br>accord<br>Mongolia<br>・・・ |

| DOCUMENT PAIR NUMBER | PROBABILITY DISTRIBUTION OF SEMANTIC CLASSIFICATIONS ($PT_1$, $PT_2$) | | ESTIMATION RESULT FOR SEMANTIC CLASSIFICATION | |
|---|---|---|---|---|
| | WORDS OF JAPANESE DOCUMENT | WORDS OF ENGLISH DOCUMENT | WORDS OF JAPANESE DOCUMENT | WORDS OF ENGLISH DOCUMENT |
| 1 | アメリカ (0.4, 0.6)<br>負け (0.3, 0.7)<br>選挙 (0.4, 0.6)<br>白王 (0.87, 0.13)<br>両国国技館 (0.88, 0.12)<br>... | Hakuoh (0.65, 0.35)<br>lose (0.1, 0.9)<br>Harukafuji (0.87, 0.13)<br>U.S. (0.45, 0.55)<br>whitehouse (0.34, 0.66)<br>Congress (0.21, 0.79) | アメリカ (T2)<br>負け (T2)<br>選挙 (T2)<br>白王 (T1)<br>両国国技館 (T1)<br>... | Hakuoh (T1)<br>lose (T2)<br>Harukafuji (T1)<br>U.S. (T2)<br>whitehouse (T2)<br>Congress (T2) |
| 2 | アメリカ (0.49, 0.51)<br>予算 (0.1, 0.9)<br>議会 (0.3, 0.7)<br>春賀富士 (0.8, 0.2)<br>欠場 (0.7, 0.3)<br>秋場所 (0.8, 0.2)<br>... | U.S. (0.3, 0.7)<br>whitehouse (0.15, 0.85)<br>Congress (0.11, 0.89)<br>Harukafuji (0.78, 0.22)<br>Yokozuna (0.66, 0.34)<br>... | アメリカ (T2)<br>予算 (T2)<br>議会 (T2)<br>春賀富士 (T1)<br>欠場 (T1)<br>秋場所 (T1)<br>... | U.S. (T2)<br>whitehouse (T2)<br>Congress (T2)<br>Harukafuji (T1)<br>Yokozuna (T1) |
| 3 | 議会 (0.1, 0.9)<br>承認 (0.49, 0.51)<br>大使 (0.1, 0.9)<br>白王 (0.8, 0.2)<br>春賀富士 (0.7, 0.3)<br>モンゴル (0.51, 0.49) | Hakuoh (0.73, 0.27)<br>Harukafuji (0.6, 0.4)<br>Ambassador (0.2, 0.8)<br>accord (0.4, 0.6)<br>Mongolia (0.49, 0.51)<br>... | 議会 (T2)<br>承認 (T2)<br>大使 (T2)<br>白王 (T1)<br>春賀富士 (T1)<br>モンゴル (T1) | Hakuoh (T1)<br>Harukafuji (T1)<br>Ambassador (T2)<br>accord (T2)<br>Mongolia (T2)<br>... |

F I G. 1 0

| SEMANTIC CLASSIFICATION | DOCUMENT PAIR NUMBER | WORDS OF JAPANESE DOCUMENT | WORDS OF ENGLISH DOCUMENT |
|---|---|---|---|
| T1 | 1 | 白王<br>両国国技館<br>... | Hakuoh<br>Harukafuji<br>... |
| T1 | 2 | 春賀富士<br>欠場<br>秋場所<br>... | Harukafuji<br>Yokozuna<br>... |
| T1 | 3 | 白王<br>春賀富士<br>モンゴル<br>... | Hakuoh<br>Harukafuji<br>... |
| T2 | 1 | アメリカ<br>負け<br>選挙<br>... | lose<br>U.S.<br>whitehouse<br>Congress<br>... |
| T2 | 2 | アメリカ<br>予算<br>議会<br>... | U.S.<br>whitehouse<br>Congress<br>... |
| T2 | 3 | 議会<br>承認<br>大使<br>... | Ambassador<br>accord<br>Mongolia<br>... |

| DOCUMENT PAIR NUMBER | PROBABILITY DISTRIBUTION OF SEMANTIC CLASSIFICATIONS ($PT_1, PT_2$) | | ESTIMATION RESULT FOR SEMANTIC CLASSIFICATION | |
|---|---|---|---|---|
| | WORDS OF JAPANESE DOCUMENT | WORDS OF ENGLISH DOCUMENT | WORDS OF JAPANESE DOCUMENT | WORDS OF ENGLISH DOCUMENT |
| 1 | アメリカ (0.4, 0.6)<br>負け (0.3, 0.7)<br>選挙 (0.4, 0.6)<br>白王 (0.91, 0.09)<br>両国国技館 (0.9, 0.1)<br>・・・ | Hakuoh (0.92, 0.08)<br>lose (0.1, 0.9)<br>Harukafuji (0.91, 0.09)<br>U.S. (0.45, 0.55)<br>whitehouse (0.34, 0.66)<br>Congress (0.21, 0.79)<br>・・・ | アメリカ (T2)<br>負け (T2)<br>選挙 (T2)<br>白王 (T1)<br>両国国技館 (T1)<br>・・・ | Hakuoh (T1)<br>lose (T2)<br>Harukafuji (T1)<br>U.S. (T2)<br>whitehouse (T2)<br>Congress (T2)<br>・・・ |
| 2 | アメリカ (0.49, 0.51)<br>予算 (0.1, 0.9)<br>議会 (0.2, 0.8)<br>春賀富士 (0.84, 0.16)<br>欠場 (0.7, 0.3)<br>秋場所 (0.8, 0.2)<br>・・・ | U.S. (0.35, 0.65)<br>whitehouse (0.1, 0.9)<br>Congress (0.11, 0.89)<br>Harukafuji (0.88, 0.12)<br>Yokozuna (0.81, 0.19)<br>・・・ | アメリカ (T2)<br>予算 (T2)<br>議会 (T2)<br>春賀富士 (T1)<br>欠場 (T1)<br>秋場所 (T1)<br>・・・ | U.S. (T2)<br>whitehouse (T2)<br>Congress (T2)<br>Harukafuji (T1)<br>Yokozuna (T1)<br>・・・ |
| 3 | 議会 (0.1, 0.9)<br>承認 (0.36, 0.64)<br>大使 (0.1, 0.9)<br>白王 (0.9, 0.1)<br>春賀富士 (0.8, 0.2)<br>モンゴル (0.62, 0.38)<br>・・・ | Hakuoh (0.83, 0.17)<br>Harukafuji (0.88, 0.12)<br>Ambassador (0.2, 0.8)<br>accord (0.4, 0.6)<br>Mongolia (0.55, 0.45)<br>・・・ | 議会 (T2)<br>承認 (T2)<br>大使 (T2)<br>白王 (T1)<br>春賀富士 (T1)<br>モンゴル (T1)<br>・・・ | Hakuoh (T1)<br>Harukafuji (T1)<br>Ambassador (T2)<br>accord (T2)<br>Mongolia (T1)<br>・・・ |

| SEMANTIC CLASSIFICATION | DOCUMENT PAIR NUMBER | WORDS OF JAPANESE DOCUMENT | WORDS OF ENGLISH DOCUMENT |
|---|---|---|---|
| T1 | 1 | 白王<br>両国国技館<br>・・・ | Hakuoh<br>Harukafuji<br>・・・ |
| T1 | 2 | 春賀富士<br>欠場<br>秋場所<br>・・・ | Harukafuji<br>Yokozuna<br>・・・ |
| T1 | 3 | 白王<br>春賀富士<br>モンゴル<br>・・・ | Hakuoh<br>Harukafuji<br>Mongolia<br>・・・ |
| T2 | 1 | アメリカ<br>負け<br>選挙<br>・・・ | lose<br>U.S.<br>whitehouse<br>Congress<br>・・・ |
| T2 | 2 | アメリカ<br>予算<br>議会<br>・・・ | U.S.<br>whitehouse<br>Congress<br>・・・ |
| T2 | 3 | 議会<br>承認<br>大使<br>・・・ | Ambassador<br>accord<br>・・・ |

111

F I G. 1 3

| SEMANTIC CLASSIFICATION | WORD PAIR | | PROBABILITY OF CORRESPONDENCE |
|---|---|---|---|
| | JAPANESE | ENGLISH | |
| T1 | 白王 | Hakuoh | 0.7 |
| | 春賀富士 | Harukafuji | 0.5 |
| | モンゴル | Mongolia | 0.5 |
| | ⋮ | ⋮ | ⋮ |
| T2 | アメリカ | U.S. | 0.7 |
| | 議会 | Congress | 0.5 |
| | 承認 | approve | 0.6 |
| | ⋮ | ⋮ | ⋮ |

425

F I G. 1 4 A

| RANK | WORD PAIR | | SCORE |
|---|---|---|---|
| | JAPANESE | ENGLISH | |
| 1 | アメリカ | U.S. | 0.95 |
| 2 | 白王 | Hakuoh | 0.95 |
| 3 | モンゴル | Mongolia | 0.89 |
| 4 | 春賀富士 | Harukafuji | 0.88 |
| 5 | 議会 | Congress | 0.84 |
| 6 | 承認 | approve | 0.81 |
| 7 | 負け | lose | 0.77 |
| ⋮ | ⋮ | ⋮ | ⋮ |

426

F I G. 1 4 B

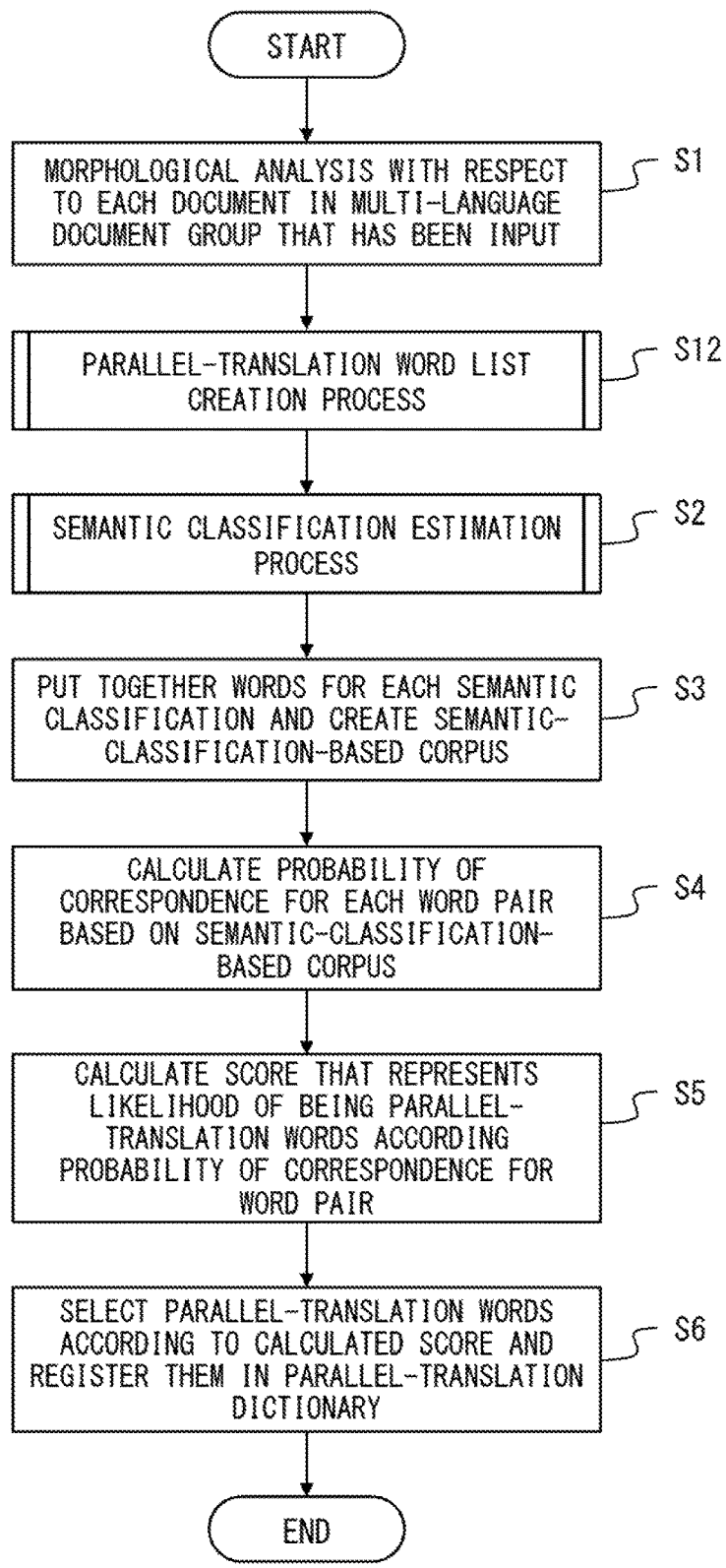
F I G. 16

| t (i) | JAPANESE (i=J) | ENGLISH (i=E) |
|---|---|---|
| 1 | 成人, 大人, 成年 | adult |
| 2 | 混ぜ物, 不純物 | adulteration |
| 3 | タンク, 戦車, 槽 | tank |
| 4 | 修正予算 | amended budget |
| 5 | 兵舎 | barracks |
| ⋮ | ⋮ | ⋮ |

— 113

F I G. 1 8 A

| | JAPANESE | ENGLISH |
|---|---|---|
| 1 | 成人, 大人, 成年 | adult |
| 2 | 修正予算 | amended budget |
| 3 | 兵舎 | barracks |

— 103D

F I G. 1 8 B

|   | JAPANESE | ENGLISH |
|---|---|---|
| 1 | (NONE REGISTERED) | (NONE REGISTERED) |

103D

F I G. 2 1 A

| RANK | WORD PAIR | | SCORE |
|---|---|---|---|
|  | JAPANESE | ENGLISH |  |
| 1 | 白王 | Hakuoh | 0.95 |
| 2 | アメリカ | U.S | 0.95 |
| 3 | モンゴル | Mongolia | 0.89 |
| 4 | 春賀富士 | Harukafuji | 0.88 |
| 5 | 議会 | Congress | 0.84 |
| 6 | 承認 | approve | 0.81 |
| 7 | 負け | lose | 0.77 |
| ⋮ | ⋮ | ⋮ | ⋮ |

431

F I G. 2 1 B

|   | JAPANESE | ENGLISH |
|---|---|---|
| 1 | 白王 | Hakuoh |

103D

F I G. 2 1 C

| RANK | WORD PAIR | | SCORE |
|---|---|---|---|
| | JAPANESE | ENGLISH | |
| 1 | 白王 | Hakuoh | 0.96 |
| 2 | 春賀富士 | Harukafuji | 0.95 |
| 3 | アメリカ | U.S | 0.93 |
| 4 | 議会 | Congress | 0.88 |
| 5 | モンゴル | Mongolia | 0.85 |
| 6 | 承認 | approve | 0.81 |
| 7 | 負け | lose | 0.77 |
| ⋮ | ⋮ | ⋮ | ⋮ |

432

F I G. 2 1 D

| | JAPANESE | ENGLISH |
|---|---|---|
| 1 | 白王 | Hakuoh |
| 2 | 春賀富士 | Harukafuji |

| WORD GROUP THAT SATISFIES CONDITION OF COMPOUND NOUN |
|---|
| 次期 / 大統領 / 立候補 |
| 両国 / 国技館 |
| アメリカ / 相撲 / 協会 |

|   | JAPANESE | ENGLISH |
|---|---|---|
| 1 | 成人 | adult |
| 2 | 予算 | budget |
| 3 | 両国国技館 | Ryogoku Kokugikan |
| ⋮ | ⋮ | ⋮ |

| RANK | WORD PAIR | | SCORE |
|---|---|---|---|
| | JAPANESE | ENGLISH | |
| 1 | アメリカ | U.S. | 0.95 |
| 2 | 春賀富士 | Harukafuji | 0.95 |
| 3 | モンゴル | Mongolia | 0.89 |
| 4 | 白王 | Hakuoh | 0.88 |
| 5 | 議会 | Congress | 0.84 |
| 6 | 次期大統領立候補 | ⋯ | 0.81 |
| 7 | アメリカ相撲協会 | ⋯ | 0.77 |
| ⋮ | ⋮ | ⋮ | ⋮ |

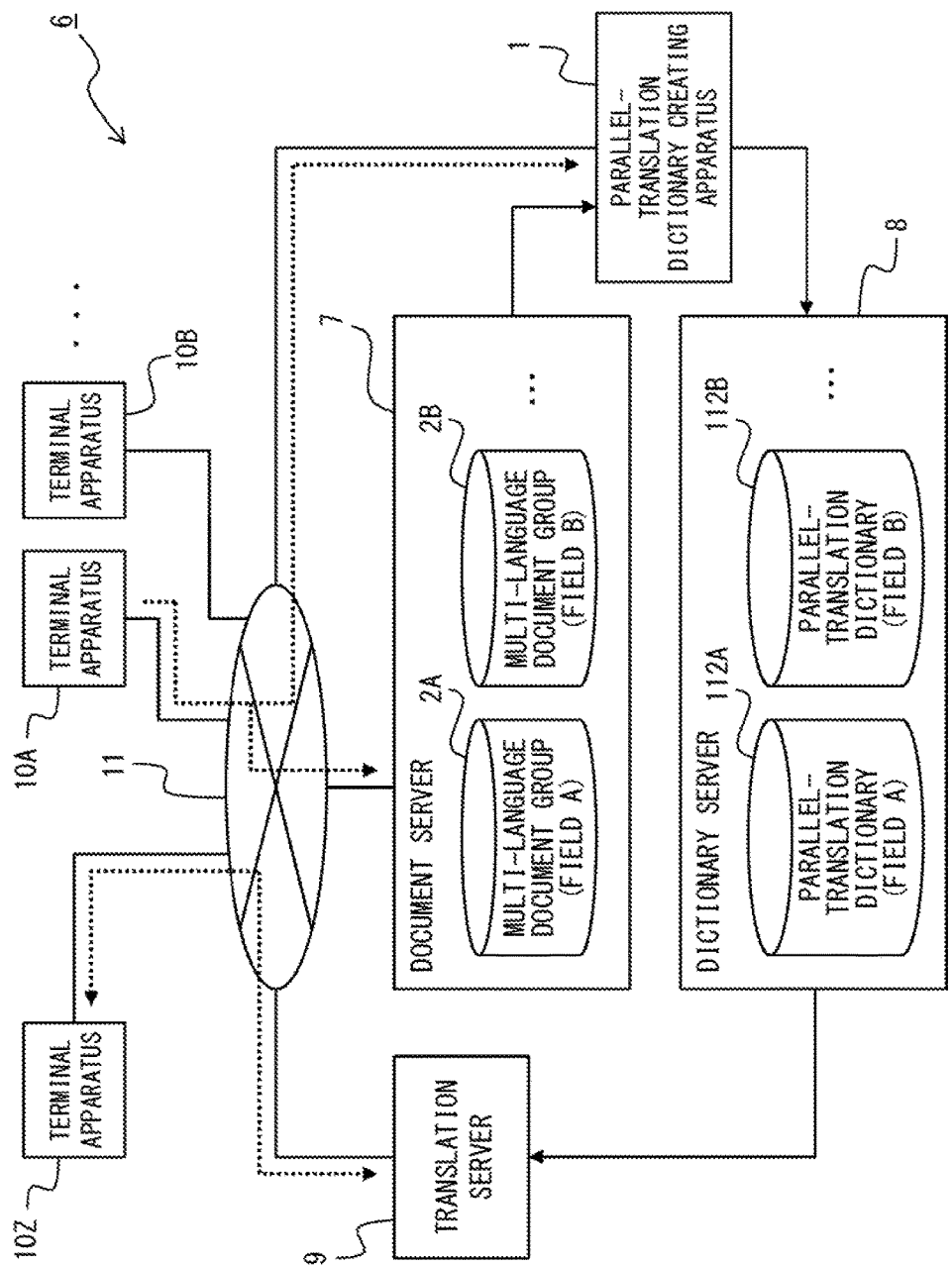
F I G. 25

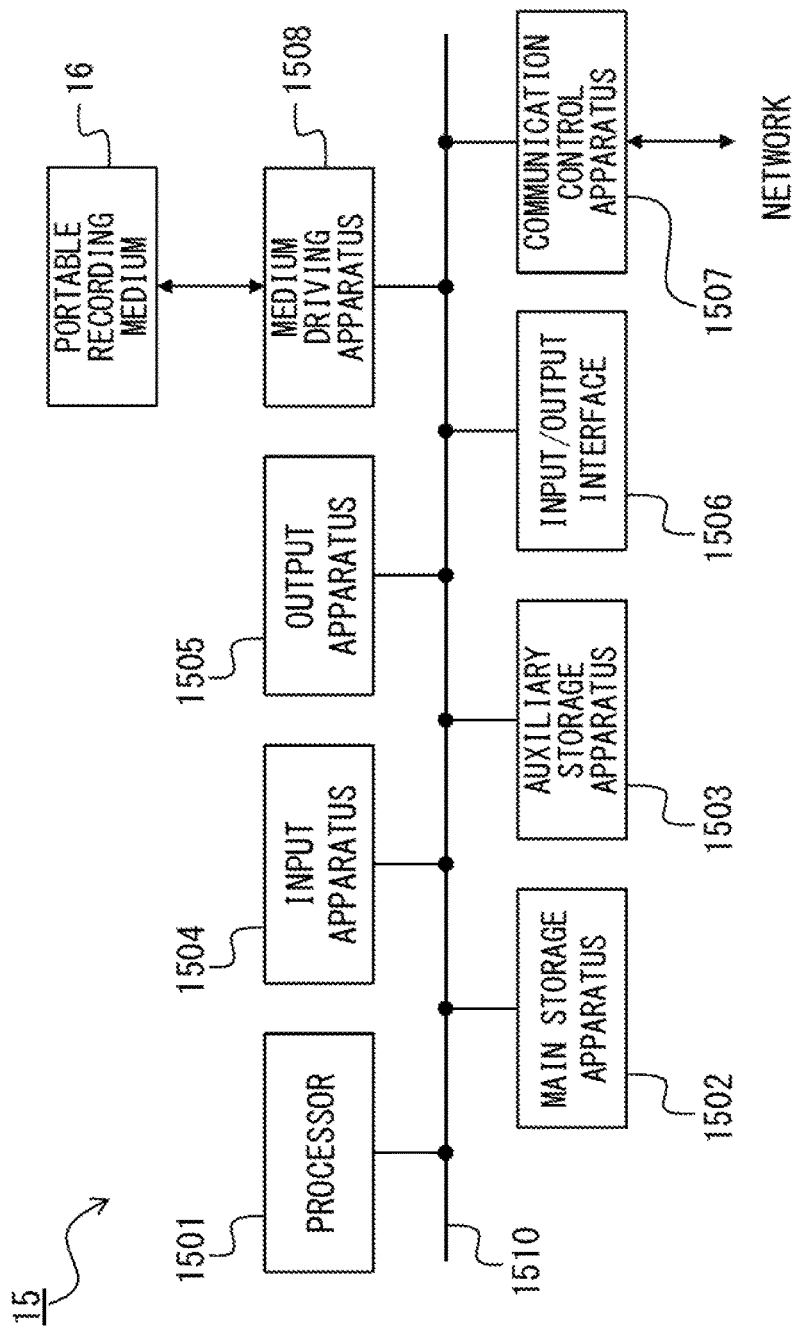
F I G. 26

PARALLEL-TRANSLATION DICTIONARY CREATING APPARATUS AND METHOD

CROSS-REFERENCE TO RELATED APPLICATIONS

This application is based upon and claims the benefit of priority of the prior Japanese Patent Application No. 2016-139356, filed on Jul. 14, 2016, the entire contents of which are incorporated herein by reference.

FIELD

The embodiments discussed herein are related to a parallel-translation dictionary creating apparatus.

BACKGROUND

In recent years, occasions are increasing in which technical documents and business documents that contain technical terms and company-specific terms are translated and offered in multiple languages, in global companies, communities in which people of different mother tongues gather together, and the like. In order to accurately translate documents that contain technical terms and the like, it is necessary to prepare a parallel-translation dictionary that contains parallel translations for such technical terms and the like.

As a method for creating a parallel-translation dictionary that contains parallel translations for technical terms and the like, a method has been known in which parallel-translation words across multiple languages are extracted using a multi-language document group that includes documents of multiple languages which contain a corresponding subject matter. In this kind of creation method, for example, using a large-scale seed dictionary prepared in advance, the word vector of each word is obtained from the context and syntax, and a pair of words whose word vectors are close across languages are extracted as parallel-translation words (for example, see Non-Patent Document 1).

Meanwhile, as another method for extracting parallel-translation words across multiple languages using a multi-language document group, a method has been known in which parallel-translation words are extracted based on the topic (semantic classification) of words (for example, see Non-Patent Document 2). This kind of extraction method utilizes the idea that words in a document have a potential topic, and words having the same topic tend to appear in the same document. That is, topics of words are modelled by taking into account only the frequency of appearance in the document while ignoring the arrangement order of words in the document, and parallel-translation words are extracted from a pair of words that have the same topic across multiple languages.

Non-Patent Document 1: Andrade, Daniel, Matsuzaki, Takuya, & Tsujii, Jun'ichi, "Effective Use of Dependency Structure for Bilingual Lexicon Creation.", In Alexander Gelbukh (Ed.), Computational Linguistics and Intelligent Text Processing: 12th International Conference, CICLing 2011, Tokyo, Japan, Feb. 20-26, 2011. Proceedings, Part II (pp. 80-92). Berlin, Heidelberg: Springer Berlin Heidelberg.

Non-Patent Document 2: Liu, Xiaodong, Duh, Kevin, & Matsumoto, Yuji, "Multilingual Topic Models for Bilingual Dictionary Extraction.", ACM Transactions on Asian and Low-Resource Language Information Processing, Volume 14 Issue 3, June 2015, Article No. 11.

SUMMARY

According to an aspect of the embodiment, a parallel-translation dictionary creating apparatus includes a memory configured to store a parallel-translation word list in which one or more word pairs for which a parallel translation relationship across a plurality of languages has been confirmed and a semantic classification of a word, and a processor connected to the memory and configured to create a parallel-translation dictionary in which the parallel translation relationship for words across the plurality of languages is registered, based on a plurality of documents that are written in the plurality of languages and which contain a corresponding subject matter, the parallel-translation word list, and the semantic classification of words. The processor executes processes including; performing a morphological analysis with respect to each of a plurality of documents that are written in a plurality of languages and which contain a corresponding subject matter, and extracting words from each of the plurality of documents; with respect to each of the plurality of documents, performing an estimation of the semantic classification of the extracted words and making the memory store the semantic classification of the word; based on a result of the estimation of the semantic classification for the word in the document that is a current processing target and the word pair registered in the parallel-translation word list, performing an update for updating, to the semantic classification of the word for which the semantic classification has been estimated, the semantic classification of a corresponding word that corresponds to the word for which the semantic classification has been estimated and that is in a document of another language which contains a subject matter that corresponds to a subject matter of the document that is the current processing target; controlling the estimation of the semantic classification of the word and the update of the semantic classification of the corresponding word; and creating the parallel-translation dictionary based on the semantic classification of the word obtained by the estimation of the semantic classification of the word and the update of the semantic classification of the corresponding word.

The object and advantages of the embodiment will be realized and attained by means of the elements and combinations particularly pointed out in the claims.

It is to be understood that both the foregoing general description and the following detailed description are exemplary and explanatory and are not restrictive of the embodiment.

BRIEF DESCRIPTION OF DRAWINGS

FIG. 1 is a diagram illustrating the functional configuration of a parallel-translation dictionary creating apparatus according to the first embodiment;

FIG. 2 is a flowchart explaining processes executed by a parallel-translation dictionary creating apparatus according to the first embodiment;

FIGS. 6A-6E are diagrams explaining an estimation method and an update method for semantic classification according to the first embodiment;

FIGS. 7A and 7B are diagrams explaining a processing result of a semantic classification estimation process according to the first embodiment;

FIG. 8 is a diagram presenting an example of a multi-language document group;

FIG. 9 is a diagram presenting words extracted by morphological analysis;

FIG. 10 is a diagram presenting an example of a result of estimation of semantic classification in a case in which an estimation result update process is not executed;

FIG. 11 is a diagram presenting an example of a semantic-classification-based corpus in a case in which an estimation result update process is not executed;

FIG. 12 is a diagram presenting an example of an estimation result for semantic classification by a semantic classification estimation process according to the first embodiment;

FIG. 13 is a diagram presenting an example of a semantic-classification-based corpus based on a result of a semantic classification estimation process according to the first embodiment;

FIGS. 14A and 14B are diagrams presenting an example of the probability of correspondence for a word pair based on a result of a semantic classification estimation process according to the first embodiment and a score that represents the likelihood of being parallel-translation words;

FIG. 16 is a flowchart explaining processes executed by a parallel-translation dictionary creating apparatus according to the second embodiment;

FIGS. 18A and 18B are diagrams presenting an example of an existing parallel-translation dictionary and an example of a created parallel-translation word list;

FIGS. 21A-21E are diagrams explaining the progress of active learning of parallel-translation words;

FIGS. 24A-24F are diagrams explaining an example of a process of extracting a compound noun and making it into a single word;

FIG. 25 is a diagram illustrating a configuration example of a translation system according to the fifth embodiment; and FIG. 26 is a diagram illustrating the hardware configuration of a computer.

DESCRIPTION OF EMBODIMENTS

Figure 3:
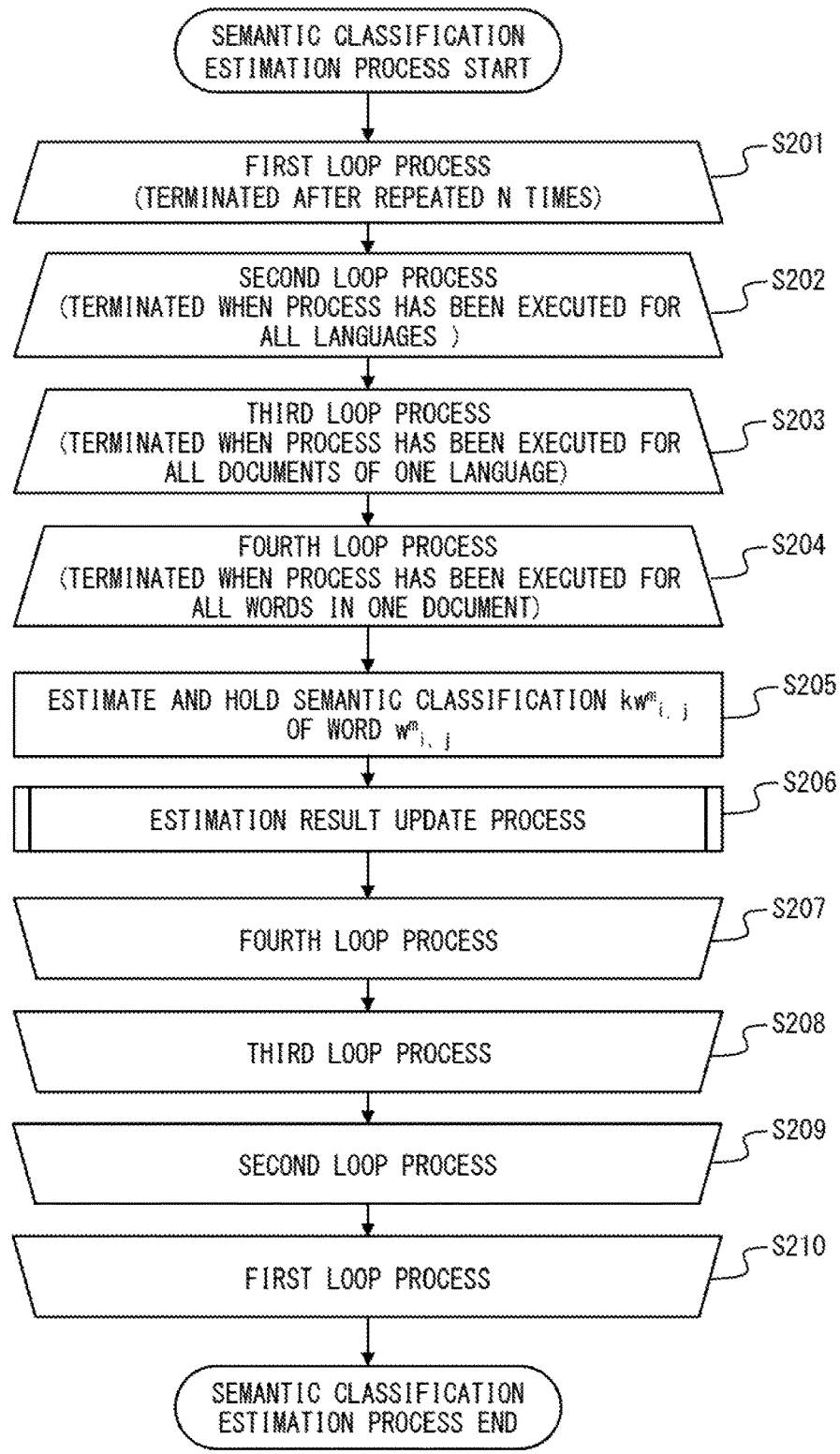
FIG. 3 is a flowchart explaining details of a semantic classification estimation process.

Preferred embodiments of the present invention will be explained with reference to accompanying drawings.

In the case in which a parallel-translation dictionary is created using a large-scale seed dictionary, the creation of the large-scale seed dictionary requires much labor, and moreover, the quantity of calculation becomes enormous, increasing the cost for the creation of the parallel-translation dictionary. In addition, in a case in which the parallel-translation dictionary is created according to the topic of a word, the topics of the respective words in a word pair across multiple languages that are actually in the parallel translation relationship may not match when there is some discrepancy in the content or the order of description between the documents in a corresponding relationship, causing a decrease in the accuracy of extraction of parallel-translation words. Hereinafter, embodiments of a parallel-translation dictionary creating apparatus and method are described with which parallel-translation words may be extracted with a good accuracy and a low cost from a group of multi-language documents which contain a corresponding subject matter.

<First Embodiment>

FIG. 1 is a diagram illustrating the functional configuration of a parallel-translation dictionary creating apparatus according to the first embodiment.

As illustrated in FIG. 1, a parallel-translation dictionary creating apparatus 1 according to the present embodiment is equipped with an input reception unit 101, a morphological analysis unit 102, a word classification unit 103, a corpus dividing unit 104, a probability-of-correspondence calculation unit 105, and an evaluation unit 106. Meanwhile, the parallel-translation dictionary creating apparatus 1 is equipped with a storing unit (not illustrated in the drawing) that stores various data including a semantic-classification-based corpus 111 and a parallel-translation dictionary 112.

The input reception unit 101 receives input of a multi-language document group 2 used for the creation of the parallel-translation document. The multi-language document group 2 includes a group or a plurality of groups of document data (hereinafter, simply referred to as "documents") that are written in multiple languages and which contain a corresponding subject matter. The multi-language document group 2 illustrated in FIG. 1 includes three Japanese documents 201-203 and three English documents 211-213. The respective three Japanese documents 201-203 contain a subject matter that corresponds to that of one of the three English documents 211-213. For example, the Japanese document 201 contains a subject matter that corresponds to that of the English document 211.

The morphological analysis unit 102 performs a morphological analysis with respect to the sentences included in each of the documents and extracts words in the sentences.

The word classification unit 103 estimates the semantic classification of each word (morpheme) for each document, according to the result of the morphological analysis. The word classification unit 103 includes a semantic classification estimation unit 103A, an estimation result holding unit 103B, an estimation result update unit 103C, a parallel-translation word list 103D, and a control unit 103E.

The corpus dividing unit 104, the probability-of-correspondence calculation unit 105, and the evaluation unit 106 function as a dictionary creating unit 110 that creates a parallel-translation dictionary 112 in which a parallel translation relationship for words across multiple languages is registered, according to the result of estimation of the semantic classification of respective words at the word classification unit 103. The corpus dividing unit 104 creates a semantic-classification-based corpus 111 in which words extracted from each document are put together for each semantic classification according to the result of estimation of the semantic classification of words by the word classification unit 103. The probability-of-correspondence calculation unit 105 calculates the probability of correspondence for word pairs across multiple languages, for each semantic classification in the semantic-classification-based corpus.

The evaluation unit 106 calculates a score that represents the likelihood of being parallel-translation words for each word pair according to the probability of correspondence for the word pairs, and registers, in the parallel-translation dictionary 112, a word pair whose score exceeds a threshold as parallel-translation words.

The word classification unit 103 in the parallel-translation dictionary creating apparatus 1 includes the semantic classification estimation unit 103A, the estimation result holding unit 103B, the estimation result update unit 103C, the parallel-translation word list 103D, and the control unit 103E, as described above.

The semantic classification estimation unit 103A estimates the semantic classification of words in a document and makes the estimation result holding unit 103B hold the result of estimation of semantic classification. When the estimation result holding unit 103B holds a result of estimation of semantic classification, the semantic classification estimation unit 103A refers to the result of estimation of semantic classification held by the estimation result holding unit 103B and estimates the semantic classification of words in document data.

The estimation result holding unit 103B holds the result of estimation of semantic classification.

The estimation result update unit 103C updates the result of estimation of semantic classification held by the estimation result holding unit 103B, according to the result of estimation of semantic classification by the semantic classification estimation unit 103A and parallel-translation words registered in the parallel-translation word list 103D.

The parallel-translation word list 103D is a list in which one or more sets of parallel-translation words confirmed as parallel-translations across multiple languages are registered.

The control unit 103E controls processes executed by the word classification unit 103 (in other words, processes executed by the semantic classification estimation unit 103A and the estimation result update unit 103C).

The parallel-translation dictionary creating apparatus 1 executes the processes described in FIG. 2 when, for example, the operator inputs a multi-language document group and inputs an order to start the creation of a parallel-translation dictionary.

FIG. 2 is a flowchart explaining processes executed by a parallel-translation dictionary creating apparatus according to the first embodiment.

As described in FIG. 2, the parallel-translation dictionary creating apparatus 1 of the present embodiment first performs morphological analysis with respect to each of the documents included in the multi-language document group 2 that has been input (step S1). The process of step S1 is executed by the morphological analysis unit 102. The parallel-translation dictionary creating apparatus 1 receives, by the input reception unit 101, input of the respective documents of the multi-language document group 2 and passes the input documents to the morphological analysis unit 102. The morphological analysis unit 102 divides the sentences of the respective documents into morphemes (words) according to a known method of morphological analysis for a document.

Next, the parallel-translation dictionary creating apparatus 1 executes a semantic classification estimation process (step S2) for estimating the semantic classification of words (morphemes) in the document data, according to the processing result for step S1. The process of step S2 is executed by the word classification unit 103. The word classification unit 103 executes the process of estimating the semantic classification of respective words in a document, for all the documents included in the multi-language document group 2. The word classification unit 103 executes, for each word, a process for calculating the probability distribution with respect to each of a plurality of semantic classifications, as a process for estimating the semantic classification of the word. In addition, the word classification unit 103 updates, according to the result of estimation of semantic classification of a word, the result of estimation of semantic classification for a corresponding word in a corresponding document in another language. Here, a corresponding document in another language is a document in another language which contains a subject matter that corresponds to that of the document for which the estimation of semantic classification of words is being performed. A corresponding word is a word in a corresponding document in another language that corresponds to a word in the document for which the estimation of semantic classification of words is being performed.

Next, the parallel-translation dictionary creating apparatus 1 creates the semantic-classification-based corpus 111 in which words in the documents are put together for each semantic classification, according to the processing result in step S2 (step S3). The process of step S3 is executed by the corpus dividing unit 104.

Next, parallel-translation dictionary creating apparatus 1 calculates the probability of correspondence for word pairs across multiple languages, based on the semantic-classification-based corpus 111 created in step S3 (step S4). The process of step S4 is executed by the probability-of-correspondence calculation unit 105. The probability-of-correspondence calculation unit 105 calculates the probability of correspondence for each word pair according to a known probability calculation method, for example.

Next, the parallel-translation dictionary creating apparatus 1 calculates a score that represents the likelihood of being parallel-translation words for a word pair, according to the probability distribution for the word pair calculated in step S4 (step S5). The process of step S5 is executed by the evaluation unit 106. The evaluation unit 106 calculates the score that represents the likelihood of being parallel-translation words for a word pair (in other words, a score that represents the accuracy with which a pair of words are correct parallel-translation words) according to a known calculation method.

Next, the parallel-translation dictionary creating apparatus 1 selects parallel-translation words according to the score calculated in step S5 and registers them in the parallel-translation dictionary (step S6). The process in step S6 is executed by the evaluation unit 106. The evaluation unit 106 selects word pairs for which the score calculated in step S5 is equal to or higher than a threshold, or a prescribed number of word pairs for which the calculated score is high, for example, and registers the word pairs in the parallel-translation dictionary.

The semantic classification estimation process (step S2) in the processes described above executed by the parallel-translation dictionary creating apparatus 1 is executed by the word classification unit 103. The word classification unit 103 executes processes described in FIG. 3, FIG. 4A and FIG. 4B as the process of step S2, for example.

FIG. 3 is a flowchart explaining details of the semantic classification estimation process.

In the semantic classification estimation process (step S2), a process of estimating the semantic classification for all the words in all the documents included in a multi-language document group is repeated a plurality of times. That is, in the semantic classification estimation process, as illustrated in FIG. 3, the first loop process (steps S201-S210) is executed that is terminated when the process of estimating the semantic classification for all the words in all the documents included in a multi-language document group has been repeated N times.

The first loop process is controlled by the control unit 103E of the word classification unit 103. The control unit 103E sets the initial value of a variable n as 1 for example, and updates the variable n as n=n+1 every time one round of processes of steps S202-S209 (a second loop process) for all the words in all the document data included in a multi-language document data group ends. Then, when the updated variable n becomes larger than a prescribed number of times N, the control unit 103E of the word classification unit 103 terminates the first loop process.

Meanwhile, the number of times N that is to be the termination condition for the first loop process may be appropriately set in any way, and it may be a fixed value that is determined in advance, or may be set by the operator at a time such as when starting the creation process for the parallel-translation dictionary, for example.

In the first loop process, as described above, the second loop process (steps S202-S209) is executed that is terminated when the process of estimating the semantic classification for all the words in all the documents of the same language, for each language of the documents included in the multi-language document group, has been repeated for all the languages.

The second loop process is controlled by the control unit 103E of the word classification unit 103. For example, the control unit 103E specifies a language that is to be the processing target by means of the value of a variable m and updates the variable m to a value that has not been selected, every time processes of steps S203-S208 (a third loop process) for all the words in all the documents of the language associated with the variable m end, for example. The variable m (the value for identifying the language) may be an integer value that starts with 1, or may be a character string such as an abbreviated designation of each language, for example. When there is no value (language) that has not been selected when updating the variable m, the control unit 103E of the word classification unit 103 terminates the second loop process.

In the second loop process, as described above, the third loop process (steps S203-S208) is executed that is terminated when the process of estimating the semantic classification for all the words in a document, for each document of the selected language, has been repeated for all the documents of the selected language.

The third loop process is controlled by the control unit 103E of the word classification unit 103. For example, the control unit 103E specifies a document that is to be the processing target by means of the value of a variable j and updates the variable j as j=j+1 every time processes of steps S204-S208 (a fourth loop process) for all the words in the document associated with the variable j end. The variable j (the value for identifying a document) is an integer value that starts with 1, for example. The control unit 103E sets the initial value of the variable j as 1 and updates the variable j as j=j+1 every time processes of steps S204-S207 (the fourth loop process) for all the words in the document specified by the variable j end, for example. Then, when the updated variable j becomes larger than the number of documents J of the selected language, the control unit 103E of the word classification unit 103 terminates the third loop process.

In the third loop process, as described above, a fourth loop process (steps S204-S207) is executed that is terminated when the process of estimating the semantic classification for each word of the document specified by the variable j has been repeated for all the words of the specified document.

The fourth loop process is controlled by the control unit 103E of the word classification unit 103. The control unit 103E specifies a word that is to be the processing target by means of the value of a variable i, for example. The variable i (the value for identifying a word) is an integer value that starts with 1, for example. Then, the control unit 103E updates the variable i as i=i+1 every time processes of steps S205 and S206 for all the words in the specified document end. When the updated variable i becomes larger than the number of words I of the selected document, the control unit 103E of the word classification unit 103 terminates the fourth loop process.

In the fourth loop process, processes of step S205 and S206 are executed for each word $w^m_{i,j}$ of document data $d^m_j$ that is the current processing target.

In the fourth loop process, a word $w^m_{i,j}$ that is to be the processing target is specified by means of variable i; after that, the semantic classification $kw^m_{i,j}$ of the specified processing-target word $w^m_{i,j}$ is estimated, and the estimated semantic classification $kw^m_{i,j}$ is stored in the estimation result holding unit 103B (step S205). The process of step S205 is executed by the semantic classification estimation unit 103A of the word classification unit 103. The semantic classification estimation unit 103A estimates the semantic classification $kw^m_{i,j}$ of the word $w^m_{i,j}$ according to a known statistical processing method such as Gibbs sampling, for example.

Next, the word classification unit 103 executes the estimation result update process (step S206) for updating the result of estimation of semantic classification (the semantic classification $kw^m_{i,j}$) of a word $w^{-m}_{i',j}$ that exists in a corresponding document in another language $d^{-m}_j$ with respect to the current processing-target document $d^m_j$ and that corresponds to the word $w^m_{i,j}$. The process of step S206 is executed by the estimation result update unit 103C. The estimation result update unit 103C executes processes described in FIG. 4A and FIG. 4B as the process of step S206.

Figure 4A:
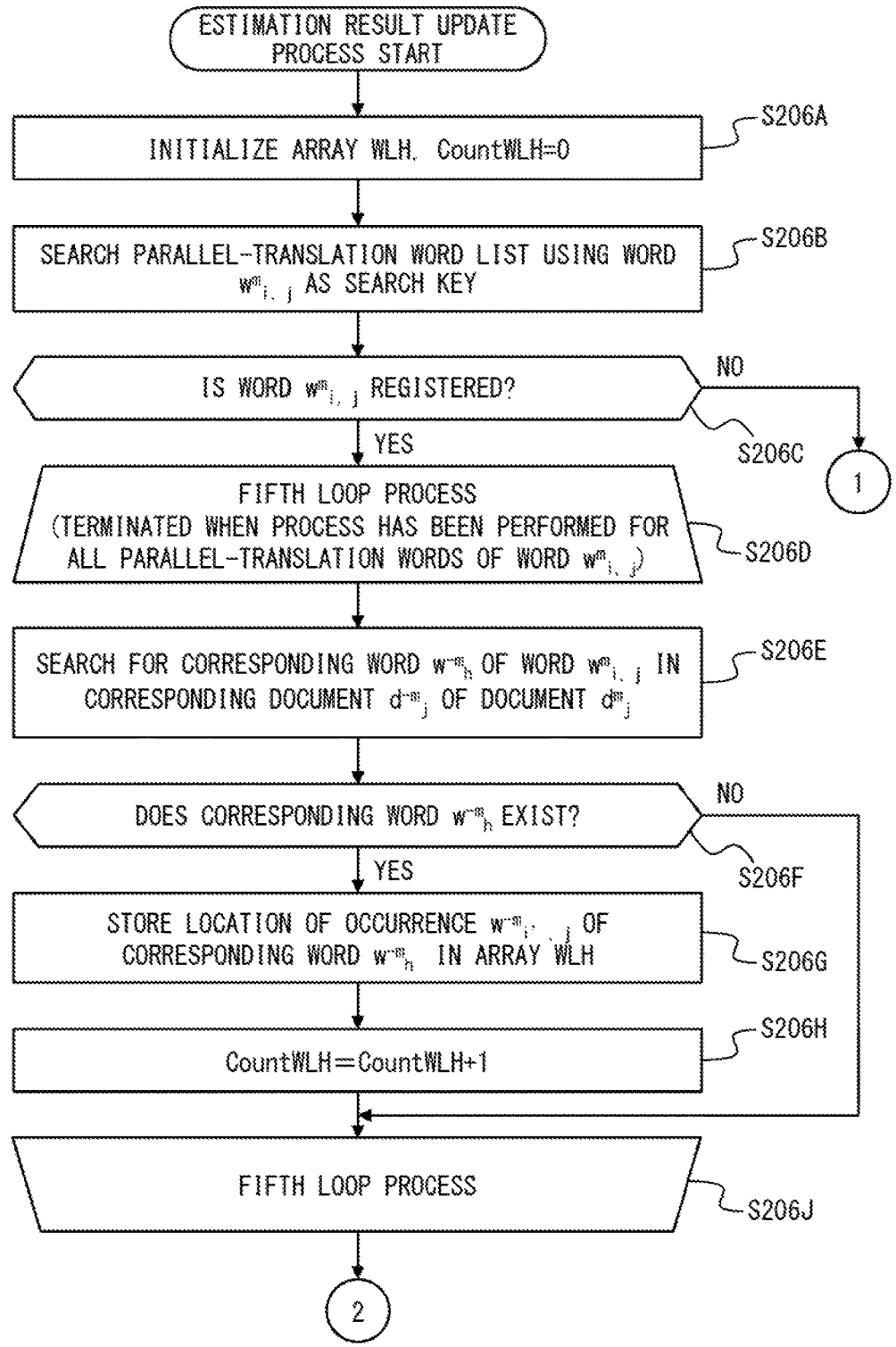
FIGS. 4A and 4B are flowcharts explaining details of an estimation result update process.
Figure 4B:
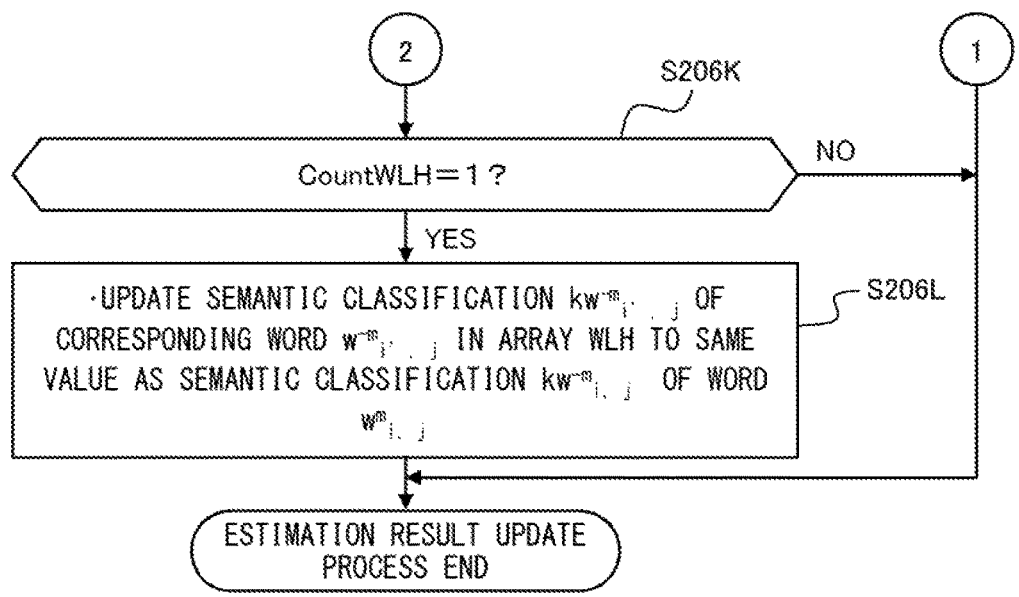

FIGS. 4A and 4B are flowcharts explaining details of an estimation result update process.

In the estimation result update process, the estimation result update unit 103C first initializes an array WLH and initializes a value CountWLH that represents the number of elements in the array WLH to "0", as described in FIG. 4A (step S206A).

Next, the estimation result update unit 103C searches the parallel-translation word list 103D using the word $w^m_{i,j}$ that is the current processing target as a search key (step S206B) and determines whether or not the word $w^m_{i,j}$ is registered in the parallel-translation word list 103D (step S206C). When the word $w^m_{i,j}$ is not registered in the parallel-translation word list 103D (step S206C; NO), the estimation result update unit 103C terminates the estimation result update process, as described in FIG. 4B.

Meanwhile, when the word $w^m_{i,j}$ is registered in the parallel-translation word list 103D (step S206C; YES), the estimation result update unit 103C next executes a fifth loop process (steps S206D-S206J). The fifth loop process ends when a process (steps S206E-S206H) for extracting a corresponding word $w^{-m}_h$ of the word $w^m_{i,j}$ from a corresponding document in another language has been executed for all the corresponding words.

The fifth loop process is controlled by the estimation result update unit 103C. The estimation result update unit 103C specifies a corresponding word $w^{-m}{}_h$ of the word $w^m{}_{i,j}$ by means of the value of a variable h, for example. The variable h (the value for identifying a corresponding word $w^{-m}{}_h$) is an integer value that starts with 1, for example. The estimation result update unit 103C updates the variable h to h+1 every time the process for extracting a corresponding word $w^{-m}{}_h$ of the word $w^m{}_{i,j}$ from a corresponding document in another language ends. Then, when the updated variable h becomes larger than the number H of corresponding words $w^{-m}{}_h$, the estimation result update unit 103C terminates the fifth loop process.

In the fifth loop process, the estimation result update unit 103C searches the words of a corresponding document $d^{-m}{}_j$ using a corresponding word $w^{-m}{}_h$ specified by means of the variable h as a search key (step S206E). After performing the search, the estimation result update unit 103C determines whether or not the corresponding word $w^{-m}{}_h$ exists in the corresponding document in another language $d^{-m}{}_j$ (step S206F).

When the corresponding word $w^{-m}{}_h$ exists in the corresponding document in another language $d^{-m}{}_j$ (step S206F; YES), the estimation result update unit 103C stores, in the array WLH, information that represents the location of occurrence of the corresponding word $w^{-m}{}_h$ (that is, the word $w^{-m}{}_{i',j}$) in the corresponding document in another language $d^{-m}{}_j$ (step S206G). Following that, the estimation result update unit 103C updates a value CountWLH that represents the number of elements (the words $w^{-m}{}_{i',j}$) of the array WLH to CountWLH+1 (step S206H).

After step S206H, the estimation result update unit 103C updates the variable h for specifying a corresponding word $w^{-m}{}_h$, and when h≤H, the fifth loop process is continued. Then, when the variable h updated after step S206H becomes h>H, the estimation result update unit 103C terminates the fifth loop process.

Meanwhile, when the corresponding word $w^{-m}{}_h$ does not exist in the corresponding document in another language $d^{-m}{}_j$ (step S206F; NO), the estimation result update unit 103C skips steps S206G and S206F, and updates the variable h for specifying the corresponding word $w^{-m}{}_h$. After that, the control unit 103E continues the fifth loop process when the updated variable h is h≤H, and when the updated variable is h>H, the fifth loop process is terminated.

When the fifth loop process is terminated, the estimation result update unit 103C next reads the value CountWLH that represents the number of elements in the array WLH and determines whether CountWLH=1 (step S206K), as described in FIG. 4B. When CountWLH≠1 (step S206K; NO), the estimation result update unit 103C terminates the estimation result update process.

Meanwhile, when CountWLH=1 (step S206K; YES), the estimation result update unit 103C accesses the estimation result holding unit 103B and updates the semantic classification $kw^{-m}{}_{i',j}$ of the word $w^{-m}{}_{i',j}$ stored in the array WLH (step S206L). In step S206L, the estimation result update unit 103C updates the semantic classification $kw^{-m}{}_{i',j}$ of the word $w^{-m}{}_{i',j}$ to the same value as the semantic classification $kw^m{}_{i,j}$ of the word $w^m{}_{i,j}$ that is the current processing target. Upon finishing the process of step S206L, the estimation result update unit 103C terminates the estimation result update process for the word $w^m{}_{i,j}$ that is the current processing target.

When the estimation result update process is terminated, the control unit 103E of the word classification unit 103 executes a process to determine whether or not to terminate the fourth loop process (step S207 in FIG. 3). The control unit 103E of the word classification unit 103 updates the variable i that specifies the processing-target word $w^m{}_{i,j}$ in the selected document $d^m{}_j$. The control unit 103E continues the fourth loop process when the updated variable i is and terminates the fourth loop process when the updated variable is i>I.

When the fourth loop process is terminated, the control unit 103E of the word classification unit 103 executes a process to determine whether or not to terminate the third loop process (step S208 in FIG. 3). The control unit 103E of the word classification unit 103 updates the variable j that specifies the processing-target document $d^m{}_j$ from documents of the selected language. The control unit 103E continues the third loop process when the updated variable j is j≤J and terminates the third loop process when the updated variable is j>J.

When the third loop process is terminated, the control unit 103E of the word classification unit 103 executes a process to determine whether or not to terminate the second loop process (step S209 in FIG. 3). The control unit 103E of the word classification unit 103 updates the variable m that specifies a language of the documents. The control unit 103E continues the second loop process when it is possible to update the variable m to a value that represents a language that has not been processed and terminates the second loop process when it is impossible to update.

When the second loop process is terminated, the control unit 103E of the word classification unit 103 executes a process to determine whether or not to terminate the first loop process (step S210 in FIG. 3). The control unit 103E of the word classification unit 103 updates the variable n that represents the number of the second loop processes that have been executed. The control unit 103E continues the first loop process when the updated variable n is n≤N and terminates the first loop process when the updated variable is n>N.

When the first loop process is terminated, the control unit 103E of the word classification unit 103 passes the result of estimation of semantic classification of each word held by the estimation result holding unit 103B to the corpus dividing unit 104 and makes the corpus dividing unit 104 execute the process of step S3.

In the semantic classification estimation process according to the present embodiment, the semantic classification of the word that is the current processing target is estimated, and the estimation result update process is executed in which the semantic classification of a corresponding word of the word that is the current processing target is estimated, as described above. In order to explain the difference that occurs in the result of estimation of semantic classification between the case in which the estimation result update process is not executed and the case in which the estimation result update process is executed, first, with reference to FIGS. 5A-5C, the semantic classification estimation process in the case in which the estimation result update process is not executed is explained.

Figures 5A, 5B, 5C:
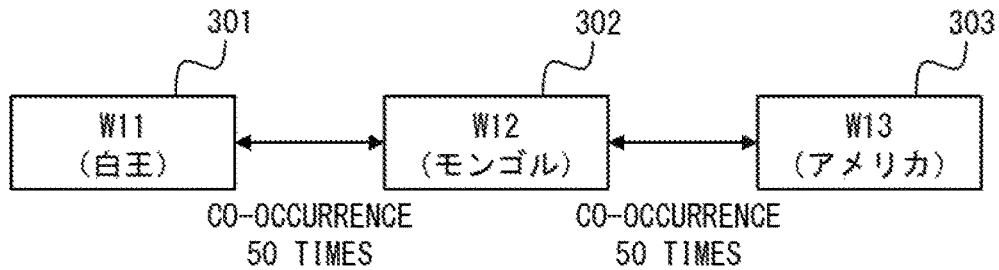
FIGS. 5A-5C are diagrams explaining the semantic classification estimation process in a case in which an estimation result update process is not executed.

FIGS. 5A-5C are diagrams explaining the semantic classification estimation process in the case in which the estimation result update process is not executed.

The process of estimating the semantic classification of a word utilizes the idea that words in a document have a potential semantic classification (topic), and words having the same semantic classification tend to appear in the same document. At this time, the similarity (distance) between the semantic classifications of words is represented by the statistics of the frequency of co-occurrence in the context of the document.

FIG. 5A presents an example of the frequency of co-occurrence for three words that appear in a document written in Japanese. In FIG. 5A, a block 301 represents a Japanese word W11 that is Romanized as "Hakuoh". The Japanese word W11 is a word that represents the name of a fictional Sumo wrestler from Mongolia and corresponds to "Hakuoh" in English notation. A block 302 represents a Japanese word W12 that is Romanized as "Mongoru". The Japanese word W12 is a word that represents a country name and corresponds to "Mongolia" in English notation. A block 303 represents a Japanese word W13 that is Romanized as "Amerika". The Japanese word W13 is a word that represents a country name and corresponds to "America" and "U.S." in English notation.

Here, assuming that the frequency of co-occurrence of the word W11 and the word W12, and the frequency of co-occurrence of the word W12 and the word W13 in a document are respectively 50 times, the probability that the semantic classification of the word W12 is the same as the semantic classification of the word W11 and the probability that the semantic classification of the word W12 is the same semantic classification as that of the word W13 is 1:1. Therefore, a result of estimation that looks like a table 401 presented in FIG. 5B is obtained by repeating the process of estimating the semantic classification of the words W11, W12, and W13 in one document a plurality of times. Meanwhile, T1-T6 in the table 401 respectively represent a different semantic classification (topic). In addition, the specific meaning of each semantic classification, such as "T1 (SUMO)", "T2 (POLITICS)" is presented in the table 401, and these specific meanings are the meanings of the semantic classifications T1-T6 that are estimated from the processing result in the table 401.

When the estimation result update process is not executed, the process of estimating the semantic classification of words in a document is an independent process for each of multiple languages. For this reason, the result of estimation of semantic classification for the word W11 is different for each process, as presented in FIG. 5B. Therefore, the result of estimation of semantic classification for the word W12 that is influenced by the result of estimation for the word W11 with a probability of 50% is also different for each process.

Therefore, when the probability distribution of semantic classification for each of the words W11, W12, and W13 is calculated according to the result of processing in the table 401, a result that looks like a table 402 presented in FIG. 5C is obtained. That is, there is a fluctuation in the semantic classification of the word W11 and the result of estimation of semantic classification for the word W13 in the case in which the process of estimating the semantic classification is executed a plurality of times, and therefore, a fluctuation also occurs in the result of estimation of semantic classification and the probability distribution with respect to the word W12.

Next, with reference to FIGS. 6A-FIG. 6E, and FIGS. 7A and 7B, the estimation method and the update method for semantic classification according to the first embodiment are explained.

FIG. 6A-6E are diagrams explaining the estimation method and the update method for semantic classification according to the first embodiment. FIGS. 7A and 7B are diagrams explaining a processing result of a semantic classification estimation process according to the first embodiment.

FIG. 6A presents tables 403 and 404 that represent the results of estimation of semantic classification and the parallel-translation word list 103D in the course of execution of the semantic classification estimation process with respect to a pair of one Japanese document and one English document according to the present embodiment.

The table 403 presents the results of estimation of semantic classification for three words W11, W12, and W13 in the Japanese document. It is assumed that the frequencies of co-occurrence of the words W11, W12, and W13 are in the relationship presented in FIG. 5A.

The table 404 presents the results of estimation of semantic classification for three words W21, W22, and W23 in the English document. The word W21 in the English document is a word that corresponds to the word W11 in the Japanese document. The word W22 in the English document is a word that corresponds to the word W12 in the Japanese document. The word W23 in the English document is a word that corresponds to the word W13 in the Japanese document. It is assumed that the frequencies of co-occurrence of the words W21, W22, and W23 are in a relationship that is equivalent to the relationship presented in FIG. 5A, that is, the frequency of co-occurrence of the word W11 and the word W12 and the frequency of co-occurrence of the word W12 and the word W13 in a document are the same number.

Further, it is assumed that a pair of the word W11 and the word W21 is registered in the parallel-translation word list 103D as parallel-translation words.

FIG. 6A presents the results of estimation of semantic classification in the course of a second round of the second loop process (steps S202-S209), and more specifically, at the point in time when the third loop process (steps S203-S208) for the Japanese document ends. Here, looking at the table 403, the estimation results for the second round for the respective words W11, W12, and W13 are semantic classifications that are different from the estimation results for the first round. Furthermore, the semantic classification of the word W12 is the same semantic classification as that of the word W11 in the estimation results for the first round, but in the estimation results for the second round, the semantic classification for the word W12 is the same semantic classification as that of the word W13 in the estimation results for the second round.

After that, when the third loop process (steps S203-S208) for the English document is executed, the result of estimation of semantic classification for the word W21 for the second round is as presented in the table 405 in FIG. 6B, for example. That is, the word W21 is estimated as the semantic classification T1.

In the third loop process (steps S203-S208) for the English document, the processes of step S205 and step S206 are executed for each word. Therefore, for example, after the semantic classification of the word W21 in the English document is estimated in step S205, the parallel-translation dictionary creating apparatus 1 (the semantic classification unit) executes the estimation result update process in step S206 according to the estimation result. The estimation result update process in step S206 is executed by the estimation result update unit 103C. The estimation result update unit 103C executes processes presented in FIG. 4A and FIG. 4B as the process of step S206.

In step S206, first, the estimation result update unit 103C searches the parallel-translation word list 103D and determines whether or not the English word W21 is registered (steps S206B and S206C). As presented in FIG. 6B, the word W21 is registered in the parallel-translation word list 103D. Therefore, the estimation result update unit 103C determines whether or not the Japanese word W11 specified as a parallel-translation word for the word W21 in the parallel-translation word list 103D exists in the corresponding document in another language (that is, the Japanese document) (steps S206E and S206F). As presented in the table 403 in FIG. 6B, the word W11 exists in the Japanese document. Therefore, the estimation result update unit 103C stores, in the array WLH, information that represents the storage location of the result of estimation of semantic classification for the word W11 in the second round of the estimation process for the semantic classification for the Japanese document, and updates the value CountWLH (steps S206G and S206H).

After that, in the process of FIG. 4A, the processes of steps S206E-S206H targeted at all the corresponding words of the word W21 registered in the parallel-translation word list 103D are repeated. However, only the relationship between the Japanese word W11 and the English word W21 is registered in the parallel-translation word list 103D. Therefore, the estimation result update unit 103C terminates the fifth loop process and executes the process of step S206L in FIG. 4B. That is, the estimation result update unit 103C updates the value T3 of the result of the second round of estimation of semantic classification for the word W11 in the Japanese document that corresponds to the word W21 in the English document to the value T1 of the result of the second round of estimation of semantic classification for the word W21. Accordingly, the results of estimation of semantic classification for the words in the Japanese document and in the English document at the time when the second round of the second loop process (steps S202-S209) is finished are updated as in the table 406 and the table 407 presented in FIG. 6C, respectively.

After that, a third round of the second loop process (steps S202-S209) is executed. Here, when the process of estimating the semantic classification of the word W21 in the English document (step S205) ends, the result of estimation of semantic classification is in a state presented in FIG. 6D, for example. That is, with respect to the words in the Japanese document, the semantic classification of the word W11 and the word W12 becomes "T5" and the semantic classification of the word W13 becomes "T4" as in the table 408. Meanwhile, with respect to the word W21 in the English document, the semantic classification becomes "T1" as in the table 409.

Here, when the estimation result update process in step S206 is executed again with the word W21 of the English document being the processing target, the estimation result update unit 103C updates the semantic classification of the word W11 in the Japanese document from "T5" to "T1", which is the same value as the semantic classification of the English word W21. Further, the estimation result update unit 103C also updates the semantic classification of the word W12 whose semantic classification was the same value as that of the word W11 in the results of the third round of estimation of semantic classification for the Japanese document from "T5" to "T1" that is the same value as the semantic classification of the English word W22. After that, the estimation result update unit 103C estimates the semantic classification of the words W22 and W23 in the English document, but the words W22 and W23 are not registered in the parallel-translation word list 103D. Therefore, the results of estimation of semantic classification for the words in the Japanese language and the results of estimation of semantic classification for the words in the English language at the time when the third round of the second loop process (steps S202-S209) is finished are respectively as in the table 410 and the table 411 presented in FIG. 6E.

As described above, in the case in which the pair of the word W11 in the Japanese document and the word W21 in the English document is registered in the parallel-translation word list 103D, every time the semantic classification of the word W21 in the English document is estimated, the estimation result update unit 103C updates the semantic classification of the word W11 and the like in the Japanese document according to the estimation result. Accordingly, the results of estimation of semantic classification with respect to the words W11, W12, and W13 in the Japanese document at the time when the first loop process (steps S201-S210) is finished are as in table 412 presented in FIG. 7A, for example. Meanwhile, the Japanese words W11 and W12 in the table 412 are words that correspond to "Hakuoh" and "Mongolia" in English notation, respectively. In addition, the Japanese word W13 in the table 412 is a word that corresponds to "America" and "U.S." in English notation. That is, due to the influence of the estimation result update process, the number of times that the result of estimation of semantic classification for the word W11 is "T1" becomes larger, and the fluctuation in semantic classification becomes very small. Furthermore, as the fluctuation in the result of estimation of semantic classification for the word W11 becomes small, the fluctuation in the result of estimation of semantic classification for the word W12 also becomes small. Therefore, the probability distribution of the semantic classifications of the words W11, W12, and W13 at the time when the first loop process (step S201-S210) is finished is as in the table 413 presented in FIG. 7B, for example. In the probability distribution for the word W12 according to the probability distribution (the table 413) in the case in when the estimation result update process is executed, the value for the semantic classification T1 becomes largest, which is different from the probability distribution (the table 402 in FIG. 5) in the case in which the estimation result update process is not executed. Accordingly, when the semantic-classification-based corpus 111 is created according to the probability distribution in the table 413, the words W11 and W12 are put together as words of the same semantic classification T1.

Next, with reference to FIGS. 8-13, and FIGS. 14A and 14B, the difference in the processing results between the case in which the estimation result update process is not executed and the case in which the estimation result update process is executed is explained more specifically.

FIG. 8 is a diagram presenting an example of a multi-language document group.

FIG. 8 presents a multi-language document group that includes three document pairs 21, 22, and 23, as an example of a multi-language document group. A document pair includes a document written in Japanese (Japanese document) and a document written in English (English document) which contain a corresponding subject matter. Here, in the Japanese document and the English document of a document pair, the content of the respective sentences, the order of the respective sentences and the like may be different, as long as the documents contain a corresponding subject matter. For example, the Japanese document 201 and the English document 211 of the first document pair 21 both contain descriptions whose subject matter is that Mr. Larry Clapton and Harukafuji carried out talks for the establishment of the United States Sumo Association. Meanwhile, the Japanese document 202 and the English document 212 of the second document pair 22 both contain descriptions whose subject matter is that Harukafuji was invited to the United States Congress as a witness and missed an Aki Basho. Further, the Japanese document 203 and the English document 213 of the third document pair 23 both contain descriptions whose subject matter is that the Congress of Mongolia that has produced wrestlers such as Harukafuji approved the appointment of the next Ambassador to Japan. That is, the documents 201-203 and 211-213 included in the multi-language document group presented in FIG. 8 all contains descriptions related to Sumo. Meanwhile, the Japanese documents 201-203 and the English documents 211-213 presented in FIG. 8 are documents prepared by the inventors of the present invention, and the content of the descriptions of the respective documents is fictional. For example, "Mr. Larry Clapton" is a name of a fictional American person, and "Harukafuji" is a name of a fictional wrestler from Mongolia.

When the multi-language document group including the three document pairs presented in FIG. 8 is input to the parallel-translation dictionary creating apparatus 1 and the creation process for a parallel-translation dictionary is started, the parallel-translation dictionary creating apparatus 1 performs a morphological analysis with respect to each document 201-203 and 211-213 (step S1). As a result of the process of step S1, the words that are presented in FIG. 9 are respectively extracted from the respective documents 201-203 and 211-213, for example.

FIG. 9 is a diagram presenting words extracted by morphological analysis.

FIG. 9 presents a table 420 in which the words (morphemes) extracted from each of the six documents 201-203 and 211-213 presented in FIG. 8 are put together for each document. In the table 420, the words of the Japanese documents and the words of the English documents of the document pair number 1 are words extracted by morphological analysis with respect to the Japanese document 201 and the English document 211 of the first document pair 21, respectively. The field for words of the Japanese document for the document pair number 1 contains five Japanese words. These five Japanese words are, in order from the top, words that are Romanized as "Amerika", "Make", "Senkyo", "Hakuoh", and "Ryogoku-Kokugikan". The Japanese words that are Romanized as "Make" and "Senkyo" correspond to the English words "lose" and "election", respectively. Meanwhile, the Japanese word that is Romanized as "Ryogoku-Kokugikan" is the name of a facility in Japan in which Sumo is performed, and it corresponds to "Ryogoku-Kokugikan" in English notation.

In the table 420, the words of the Japanese documents and the words of the English documents of the document pair number 2 are words extracted by morphological analysis with respect to the Japanese document 202 and the English document 212 of the second document pair 22, respectively. The field for words of the Japanese document for the document pair number 2 contains six Japanese words. These six Japanese words are, in order from the top, words that are Romanized as "Amerika", "Yosan", "Gikai", "Harukafuji", "Ketsujo", and "Aki-Basho". The Japanese words that are Romanized as "Yosan", "Gikai", and "Ketsujo" correspond to the English words "budget", "Congress", and "miss", respectively. Meanwhile, the Japanese word that is Romanized as "Harukafuji" is the name of a fictional wrestler from Mongolia, and it corresponds to "Harukafuji" in English notation. In addition, the Japanese word that is Romanized as "Aki-Basho" is a name (popular name) for a season of Sumo performance, and it corresponds to "Aki-Basho" in English notation.

In the table 420, the words of the Japanese documents and the words of the English documents of the document pair number 3 are words extracted by morphological analysis with respect to the Japanese document 203 and the English document 213 of the second document pair 23, respectively. The field for words of the Japanese document for the document pair number 3 contains six Japanese words. These six Japanese words are, in order from the top, words that are Romanized as "Gikai", "Syounin", "Taishi", "Hakuoh", "Harukafuji", and "Mongoru". The Japanese words that are Romanized as Syounin" and "Taishi" correspond to the English words "approve" and "Ambassador", respectively. Meanwhile, the Japanese word that is Romanized as "Mongoru" is a word that represents a country name, and it corresponds to "Mongolia" in English notation.

Meanwhile, the table 420 of FIG. 9 presents only a part of all the words that are extracted from a document in no particular order. In the Japanese document and the English document, words in a parallel translation relationship appear in different locations in sentences, even when the contents of the sentences are the same. In addition, when the Japanese document and the English document are documents which contain a corresponding subject matter, the order of sentences and the like are different. For this reason, when morphological analysis is performed for the respective documents, the order of appearance of words of the Japanese document and the order of appearance of words of the English document do not necessarily correspond.

When the semantic classifications of all the words are estimated according to the result of morphological analysis presented in FIG. 9 without executing the estimation result update process, a result that looks like the one presented in FIG. 10 is obtained, for example.

FIG. 10 is a diagram presenting an example of the result of estimation of semantic classification in the case in which the estimation result update process is not executed.

FIG. 10 presents a table 421 in which the probability distribution of semantic classifications and the result of estimation of semantic classification for each word are put together for each document, in the case in which the estimation result update process (step S206) is not performed in a semantic classification estimation process (step S2). In the table 421, the Japanese document and the English document of the document pair number 1 are the Japanese document 201 and the English document 211 of the first document pair 21, respectively. In the table 421, the Japanese document and the English document of the document pair number 2 are the Japanese document 202 and the English document 212 of the second document pair 22, respectively. In the table 421, the Japanese document and the English document of the document pair number 3 are the Japanese document 203 and the English document 213 of the third document pair 23, respectively. Meanwhile, the field of words for the Japanese document for the document pair number 1 in the table 421 contains, in order from the top, five Japanese words that are Romanized as "Amerika", "Make", "Senkyo", "Hakuoh", and "Ryogoku-Kokugikan". Meanwhile, the field of words for the Japanese document for the document pair number 2 contains, in order from the top, six Japanese words that are Romanized as "Amerika", "Yosan", "Gikai", "Harukafuji", "Ketsujo", and "Aki-Basho". Meanwhile, the field of words for the Japanese document for the document pair number 3 contains, in order from the top, six Japanese words that are Romanized as "Gikai", "Syounin", "Taishi", "Hakuoh", "Harukafuji", and "Mongoru".

As mentioned above, the semantic classification of words is estimated according to a known statistical processing method such as Gibbs sampling. At this time, for example, the semantic classification estimation unit 103A utilizes the tendency for words in a document to not independently appear and have a potential topic (semantic classification), and the fact that words that have the same topic tend to appear in the same document. That is, the semantic classification estimation unit 103A ignores the order of appearance of words and performs modeling of topics of words according to the frequency of appearance of words in the document and the number of topics.

For example, when the number of topics is assumed to be 2, the semantic classification estimation unit 103A calculates the probability distribution ($P_{T1}$, $P_{T2}$) with respect to a first topic T1 and a second topic T2 for each word. The probability distribution ($P_{T1}$, $P_{T2}$) is calculated according to the appearance count of each semantic classification when the process for estimating semantic estimation for all the words in the document included in a multi-language document group is executed N times, as illustrated in FIG. 3, for example. Meanwhile, when calculating the probability distribution ($P_{T1}$, $P_{T2}$) presented in FIG. 10, only the estimation of the semantic classification of words is executed, and the estimation result update process according to the present embodiment is not executed.

After calculating the probability distribution of semantic classifications for each word, the semantic classification estimation unit 103A estimates, for each word, that the semantic classification (topic) whose value of the probability distribution is the largest is the semantic classification of the word. Therefore, the semantic classification of the respective words is as in the table 421 in FIG. 10, according to the probability distribution ($P_{T1}$, $P_{T2}$) of semantic classifications for each word. Meanwhile, the result of estimation in FIG. 10 indicates the result of estimation of semantic classification for each word by means of (T1) and (T2) attached to the end of each word.

Looking at the probability distribution ($P_{T1}$, $P_{T2}$) and the result of estimation for semantic classification presented in FIG. 10, for example, in the document pairs of the document pair numbers 1 and 2, the semantic classification of the words of the Japanese document and the semantic classification of the words of the English document match. However, in the document pair of the document pair number 3, the result of estimation of semantic classification for the Japanese word that is Romanized as "Mongoru" (the underlined word in FIG. 10) is "T1", whereas the result of estimation of semantic classification for the word "Mongolia" in the English document is "T2".

In the case in which the result of estimation of semantic classification presented in FIG. 10 is obtained at the semantic classification estimation unit 103A, the corpus dividing unit 104 creates the semantic-classification-based corpus 111 by putting together the words in each document for each semantic classification (topic), according to the result of estimation.

FIG. 11 is a diagram presenting an example of the semantic-classification-based corpus in a case in which the estimation result update process is not executed.

FIG. 11 presents a semantic-classification-based corpus 111 in a table format in which the respective words are put together into words of the semantic classification T1 and words of the semantic classification T2, as an example of the semantic-classification-based corpus 111. In the semantic-classification-based corpus 111, the words of the Japanese document and the words of the English document of the document pair number 1 are the words extracted by morphological analysis with respect to the Japanese document 201 and the English document 211 of the first document pair 21, respectively. In the semantic-classification-based corpus 111, the words of the Japanese document and the words of the English document of the document pair number 2 are the words extracted by morphological analysis with respect to the Japanese document 202 and the English document 212 of the second document pair 22, respectively. In the semantic-classification-based corpus 111, the words of the Japanese document and the words of the English document of the document pair number 3 are the words extracted by morphological analysis with respect to the Japanese document 203 and the English document 213 of the third document pair 23, respectively. The field in the semantic-classification-based corpus 111 for words of the semantic classification T1 in the Japanese document for the document pair number 1 contain, in order from the top, Japanese words Romanized as "Hakuoh" and "Ryogoku-Kokugikan". The field in the semantic-classification-based corpus 111 for words of the semantic classification T1 in the Japanese document for the document pair number 2 contain, in order from the top, Japanese words written as "Harukafuji", "Ketsujo", and "Aki-Basho". The field in the semantic-classification-based corpus 111 for words of the semantic classification T1 in the Japanese document for the document pair number 3 contain, in order from the top, Japanese words Romanized as "Hakuoh", "Harukafuji", and "Mongoru".

Looking at the semantic-classification-based corpus 111 in FIG. 11, for example, the result of estimation of semantic classification for the Japanese word that is Romanized as "Hakuoh" is the first semantic classification T1. Meanwhile, the result of semantic classification for the English word "Hakuoh" that corresponds to the Japanese word that is Romanized as "Hakuoh" is also the first semantic classification T1. Further, the words put together for the first semantic classification T1 are all words that are associated with Sumo. Meanwhile, the words put together for the second semantic classification T2 in the semantic-classification-based corpus 111 in FIG. 11 are words such as election, congress and the like that are associated with other topics (politics, for example). The field in the semantic-classification-based corpus 111 for words of the semantic classification T2 in the Japanese document for the document pair number 1 contain, in order from the top, Japanese words Romanized as "Amerika", "Make", and "Senkyo". The field in the semantic-classification-based corpus 111 for words of the semantic classification T2 in the Japanese document for the document pair number 2 contain, in order from the top, Japanese words Romanized as "Amerika", "Yosan", and "Gikai". The field in the semantic-classification-based corpus 111 for words of the semantic classification T2 in the Japanese document for the document pair number 3 contain, in order from the top, Japanese words Romanized as "Gikai", "Syounin", and "Taishi".

When obtaining the probability of correspondence for word pairs according to a semantic-classification-based corpus 111 that looks like the one in FIG. 11, the probability-of-correspondence calculation unit 105 calculates, for each semantic classification, the probability of correspondence with respect to word pairs of words in the Japanese document and words in the English document that have been put together. The words in the documents of the first document pair for the first semantic classification T1 include a Japanese word that is Romanized as "Hakuoh" and an English word "Hakuoh". In this case, the probability-of-correspondence calculation unit 105 calculates the probability of correspondence of words with respect to the word pair of the Japanese word that is Romanized as "Hakuoh" and the English word "Hakuoh". Accordingly, the word pair of the word in the Japanese document that is Romanized as "Hakuoh" and the word "Hakuoh" in the English document may be extracted as parallel-translation words.

However, in the result of estimation of semantic classification with respect to the third document pair in the table 421 in FIG. 10, the Japanese word that is Romanized as "Mongoru" is the first semantic classification T1, whereas the English word "Mongolia" that corresponds to the Japanese word that is Romanized as "Mongoru" is the second semantic classification T2. Accordingly, in the semantic-classification-based corpus 111 created at the corpus dividing unit 104, the Japanese word that is Romanized as "Mongoru" is put into the first semantic classification T1, whereas the corresponding English "Mongolia" is put into the second semantic classification. In this case, the probability of correspondence of words with respect to the word pair of the Japanese word written as "Mongoru" and the English "Mongolia" is not calculated in the process of step S4, and therefore, the word pair is not to be extracted as parallel-translation words.

Meanwhile, in the present embodiment, the estimation result update process is executed for updating the result of estimation of semantic classification mentioned above. In the estimation result update process, as described above, when a word whose semantic classification has been estimated is registered in the parallel-translation word list 103D, the result of estimation of semantic classification for the corresponding word of that word whose semantic classification has been estimated is updated. By estimating the semantic classification of all the words while executing the estimation result update process according to the result of morphological analysis presented in FIG. 9, a result that looks like the one presented in FIG. 12 is obtained, for example.

FIG. 12 is a diagram presenting an example of the estimation result for semantic classification by the semantic classification estimation process according to the first embodiment.

FIG. 12 presents a table 422 in which the probability distribution of semantic classifications and the result of estimation of semantic classification for each word are put together for each document in the case in which the estimation result update process (step S206) is executed in the semantic classification estimation process (step S2). In the table 422, the Japanese document and the English document of the document pair number 1 are a Japanese document 201 and an English document 211 of a first document pair 21, respectively. In the table 422, the Japanese document and the English document of the document pair number 2 are a Japanese document 202 and an English document 212 of a second document pair 22, respectively. In the table 422, the Japanese document and the English document of the document pair number 3 are a Japanese document 203 and an English document 213 of a third document pair 23, respectively. The field in the table 422 in FIG. 12 for words of the Japanese document contain the same words as the Japanese words put in the field in the table 422 in FIG. 10 for words of the Japanese document.

In the case in which the estimation result update process is executed, as presented in FIG. 6A-FIG. 6E, and FIGS. 7A and 7B, according to the result of estimation of semantic classification for a word in a document in a given language and the parallel-translation word list 103D, the result of estimation of semantic classification for a corresponding word in a corresponding document in another language is updated. Accordingly, the result of estimation of semantic classification for a word in a document of a given language and the result of estimation of semantic classification for the corresponding word that is associated with the word in the parallel-translation word list 103D become the same value (semantic classification). In addition, when updating the result of estimation of semantic classification for the corresponding word in a corresponding document in another language, the result of estimation for a word for which a result of estimation of semantic classification is the same as that for the corresponding word is also updated. Accordingly, in the case in which the estimation result update process is executed, the possibility becomes very high that the result of estimation for the Japanese word (the underlined word) that is Romanized as "Mongoru" and the result of estimation for the English "Mongolia" in the document pair number 3 will both become the first semantic classification T1, as in the table 422 (the result of estimation of semantic classification) in FIG. 12.

In the case in which the result of estimation of semantic classification that looks like the table 422 in FIG. 12 is obtained at the semantic classification estimation unit 103A, the corpus dividing unit 104 puts together the words of each document for each semantic classification (topic), and creates the semantic-classification-based corpus 111 that looks like the one presented in FIG. 13.

FIG. 13 is a diagram presenting an example of the semantic-classification-based corpus based on the result of the semantic classification estimation process according to the first embodiment.

FIG. 13 presents a semantic-classification-based corpus 111 in a table format in which the respective words are put together into words of the semantic classification T1 and words of the semantic classification T2, as an example of the semantic-classification-based corpus 111. In the semantic-classification-based corpus 111, the words of the Japanese document and the words of the English document of the document pair number 1 are the words extracted by morphological analysis with respect to the Japanese document 201 and the English document 211 of the first document pair 21, respectively. In the semantic-classification-based corpus 111, the words of the Japanese document and the words of the English document of the document pair number 2 are the words extracted by morphological analysis with respect to the Japanese document 202 and the English document 212 of the second document pair 22, respectively. In the semantic-classification-based corpus 111, the words of the Japanese document and the words of the English document of the document pair number 3 are the words extracted by morphological analysis with respect to the Japanese document 203 and the English document 213 of the third document pair 23, respectively. Meanwhile, the field in the semantic-classification-based corpus 111 in FIG. 13 for Japanese words contains the same words as the Japanese words put in the field in the semantic-classification-based corpus 111 in FIG. 11 for words of the Japanese document.

Looking at the semantic-classification-based corpus 111 in FIG. 13, for example, the result of estimation of semantic classification for the Japanese word that is Romanized as "Hakuoh" is the first semantic classification T1. Meanwhile, the result of semantic classification for the English word "Hakuoh" that corresponds to the Japanese word that is Romanized as "Hakuoh" is also the first semantic classification T1. Further, the words put together for the first semantic classification T1 are all words that are associated with Sumo. Meanwhile, the words put together for the second semantic classification T2 in the semantic-classification-based corpus 111 in FIG. 13 are words such as election, congress and the like that are associated with other topics (politics, for example).

When obtaining the probability of correspondence for the word pair according to a semantic-classification-based corpus 111 in FIG. 13, the probability-of-correspondence calculation unit 105 calculates, for each semantic classification, the probability of correspondence with respect to word pairs of words in the Japanese document and words in the English document that have been put together. The words in the documents of the first document pair for the first semantic classification T1 include a Japanese word that is Romanized as "Hakuoh" and an English word "Hakuoh". In this case, the probability-of-correspondence calculation unit 105 calculates the probability of correspondence of words with respect to the word pair of the Japanese word that is Romanized as "Hakuoh" and the English word "Hakuoh". Accordingly, the word pair of the word in the Japanese document that is Romanized as "Hakuoh" and the word "Hakuoh" in the English document may be extracted from parallel-translation words.

In addition, in the case in which the estimation result update process is executed, the words of the documents of the third document pair for the first semantic classification T1 include a Japanese word that is Romanized as "Mongoru" and English "Mongolia". In this case, the probability-of-correspondence calculation unit 105 calculates the probability of correspondence of words with respect to the word pair of the Japanese word that is Romanized as "Mongoru" and the English word "Mongolia". Accordingly, the word pair of the word in the Japanese document that is Romanized as "Mongoru" and the word "Mongolia" in the English document may be extracted from parallel-translation words.

FIGS. 14A and 14B are diagrams presenting an example of the probability of correspondence for a word pair based on the result of the semantic classification estimation process according to the first embodiment and a score that represents the likelihood of being parallel-translation words.

FIG. 14A presents a table 425 for the probability of correspondence for word pairs for each semantic classification calculated at the probability-of-correspondence calculation unit 105 according to the semantic-classification-based corpus 111 in FIG. 13. The field in the table 425 for Japanese words for the word pairs contains, in order from the top, six Japanese words that are Romanized as "Hakuoh", "Harukafuji", "Mongoru", "Amerika", "Gikai", and "Syounin". The probability of correspondence for the word pairs is calculated according to a known calculation method for the probability of correspondence. In the table 425 in FIG. 14A, the probability of correspondence with respect to the word pair of the Japanese word that is Romanized as "Mongoru" and the English word "Mongolia" has been calculated. Accordingly, when the score that represents the likelihood of being parallel-translation words for the word pair of the word in the Japanese document that is Romanized as "Mongoru" and the word "Mongolia" in the English document that is calculated according to the probability of correspondence in the table 425 is high, the word pair is registered in the parallel-translation dictionary.

The score that represents the likelihood of being parallel-translation words for word pairs is calculated by the evaluation unit 106 according to the probability of correspondence for the respective pairs. The score that represents the likelihood of being parallel-translation words is calculated using a known calculation formula that is described in Non-Patent Document 2 or the like, for example.

When the score that represents the likelihood of being parallel-translation words is calculated for the respective word pairs in the table 425 presented in FIG. 14A and the word pairs are sorted in descending order of the score, a result that looks like a table 426 presented in FIG. 14B is obtained, for example. According to the result, the evaluation unit 106 determines word pairs to be registered in the parallel-translation dictionary to be parallel-translation words. Word pairs to be registered in the parallel-translation dictionary may be word pairs whose score is equal to or higher than a prescribed threshold, or may be a prescribed number of word pairs whose score is high. The field in the table 426 for Japanese words for the word pairs contains, in order from the top, seven Japanese words that are Romanized as "Amerika", "Hakuoh", "Mongoru", "Harukafuji", "Gikai", "Syounin", and "Make".

As described above, in the parallel-translation dictionary creating apparatus 1, when the semantic classification of a word in a given document is estimated, judgment is made as to the presence/absence of a corresponding word for which the parallel translation relationship with this word has been confirmed, referring to the parallel-translation word list 103D. Then, when a corresponding word of the word whose semantic classification has been estimated is registered in the parallel-translation word list 103D, the result of estimation of semantic classification for the corresponding word that is included in a corresponding document in another language with respect to the document that includes the word whose semantic classification has been estimated is updated to the semantic classification of the word whose semantic classification has been estimated in the current process. That is, in the semantic classification estimation process according to the present embodiment, the semantic classification of a corresponding word in a corresponding document in another language is updated, with the constraint being that the semantic classifications for a pair of words registered in the parallel-translation word list 103D for which the parallel translation relationship has been confirmed are made to correspond with each other. Further, in the parallel-translation dictionary creating apparatus 1, the result of estimation of semantic classification is also updated for a word in a corresponding document in another language for which the result of estimation of semantic classification is the same as that for the corresponding word. That is, in the semantic classification estimation process according to the present embodiment, the result of estimation of semantic classification is updated in a state in which the distance (similarity) of semantic classifications is maintained for words that are to be the same semantic classification in a corresponding document in another language. Accordingly, it becomes possible to increase the possibility that the results of estimation of semantic classification for a pair of words that may be translated as parallel translations will correspond with each other, when documents of multiple languages with content that has a corresponding relationship in a multi-language document group used for the creation of the parallel-translation dictionary are a set of documents which contain a corresponding subject matter. Therefore, according to the present embodiment, the possibility that a pair of words that may be translated as parallel translation will be extracted becomes high, and the accuracy of extraction of parallel-translation words is increased.

Further, the creating process for the parallel-translation dictionary according to the present embodiment utilizes the potential topic of words, and parallel words are extracted according to the topic (semantic classification) of each word estimated by a statistical process that takes into account only the frequency of appearance of each word in the document. Accordingly, it becomes possible to reduce the amount of calculation to extract parallel-translation words, compared with the case in which parallel-translation words are extracted from a multi-language document group that includes a plurality of documents which contain a corresponding subject matter by referring to a large-scale parallel-translation dictionary (seed dictionary). In addition, the parallel-translation word list 103D that is to be referred to in the semantic classification estimation process according to the present embodiment is only required to have one or more pairs of parallel-translation words with respect to words included in the multi-language document group registered. Therefore, according to the present embodiment, it becomes possible to reduce various costs (for example, the amount of calculation, language resources such as the seed dictionary and the like) in extracting parallel-translation words from a multi-language document group that includes a plurality of documents which contain a corresponding subject matter.

Meanwhile, the flowcharts in FIG. 2, FIG. 3, FIG. 4A, and FIG. 4B are merely examples of flowcharts that explain processes executed by the parallel-translation dictionary creating apparatus 1. Processes executed by the parallel-translation dictionary creating apparatus 1 are not limited to the processes mentioned above and changes may be appropriately made without departing from the gist of the present embodiment, such as a change in details of some processes in the semantic classification estimation process (step S2), for example.

<Second Embodiment>

Figure 15:
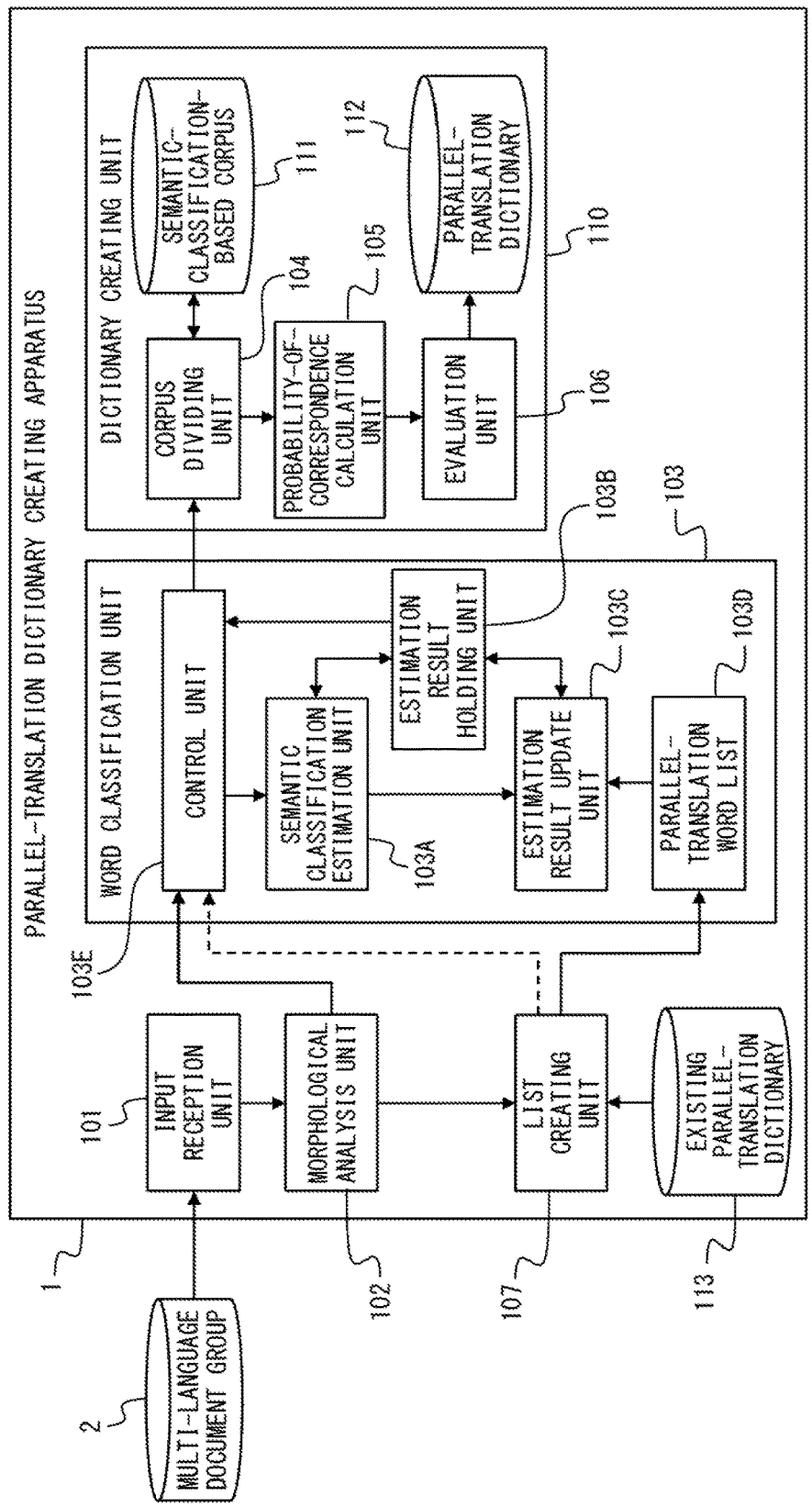
FIG. 15 a diagram illustrating the functional configuration of a parallel-translation dictionary creating apparatus according to the second embodiment.

FIG. 15 a diagram illustrating the functional configuration of a parallel-translation dictionary creating apparatus according to the second embodiment.

As illustrated in FIG. 15, a parallel-translation dictionary creating apparatus 1 according to the present embodiment is equipped with an input reception unit 101, a morphological analysis unit 102, a word classification unit 103, a corpus dividing unit 104, a probability-of-correspondence calculation unit 105, an evaluation unit 106, and a list creating unit 107. In addition, the parallel-translation dictionary creating apparatus 1 is equipped with a storing unit (not illustrated in the drawing) that stores various data including a semantic-classification-based corpus 111, a parallel-translation dictionary 112, an existing parallel-translation dictionary 113, and documents of a multi-language document group 2.

The input reception unit 101, the morphological analysis unit 102, the corpus dividing unit 104, the probability-of-correspondence calculation unit 105, and the evaluation unit 106 respectively have the function explained in the first embodiment. The corpus dividing unit 104, the probability-of-correspondence calculation unit 105, and the evaluation unit 106 function as a dictionary creating unit 110 that creates the parallel-translation dictionary 112 in which a parallel translation relationship for words across multiple languages is registered, according to the result of estimation of the semantic classification of respective words at the word classification unit 103.

The word classification unit 103 has the function explained in the first embodiment. The word classification unit 103 executes the process of estimating the semantic classification of a word and the process for updating the semantic classification of a corresponding word in a corresponding document in another language, according to the flowcharts in FIG. 3, FIG. 4A, and FIG. 4B, for example.

In the same manner as the word classification unit 103 according to the first embodiment, the word classification unit 103 in the parallel-translation dictionary creating apparatus 1 of the present embodiment includes a semantic classification estimation unit 103A, an estimation result holding unit 103B, an estimation result update unit 103C, a parallel-translation word list 103D, and a control unit 103E.

Each of the units 103A-103C, and 103E of the word classification unit 103 in the parallel-translation dictionary creating apparatus 1 of the present embodiment has the function explained in the first embodiment.

The list creating unit 107 in the parallel-translation dictionary creating apparatus 1 of the present embodiment creates the parallel-translation wordlist 103D that is to be referred to by the estimation result update unit 103C, according to the multi-language document group 2 and the existing parallel-translation dictionary 113. The existing parallel-translation dictionary 113 is a parallel-translation dictionary that is prepared in advance and that is different from the parallel-translation dictionary 112 created according to an input multi-language document group 2. That is, in the present embodiment, when creating the parallel-translation dictionary 112 based on the input multi-language document group 2, the parallel-translation word list 103D is created according to the input multi-language document group 2 and the existing parallel-translation dictionary 113.

The parallel-translation dictionary creating apparatus 1 executes the processes illustrated in FIG. 16 when, for example, the operator inputs a multi-language document group and inputs an order to start the creation of a parallel-translation dictionary.

FIG. 16 is a flowchart explaining processes executed by the parallel-translation dictionary creating apparatus according to the second embodiment.

As illustrated in FIG. 16, the parallel-translation dictionary creating apparatus 1 of the present embodiment first performs a morphological analysis with respect to each of the documents included in the multi-language document group 2 that has been input (step S1). The process of step S1 is executed by the morphological analysis unit 102. The parallel-translation dictionary creating apparatus 1 receives, by the input reception unit 101, the input of the respective documents of the multi-language document group 2 and passes the input documents to the morphological analysis unit 102. The morphological analysis unit 102 divides the sentences of the respective documents into morphemes (words) according to a known method of morphological analysis for a document.

Next, the parallel-translation dictionary creating apparatus 1 executes a parallel-translation word list creation process (step S12) for creating the parallel-translation word list 103D according to the processing result for step S1 and the existing parallel-translation dictionary 113. The process of step S12 is executed by the list creating unit 107. The list creating unit 107 calculates a registration score that takes into account the statistics in the multi-language document group and the ambiguity in parallel translation, for the respective parallel-translation words in the existing parallel-translation dictionary 113. After calculating the registration score, the list creating unit 107 registers, in the parallel-translation word list 103D, the parallel-translation words whose score is high.

Next, the parallel-translation dictionary creating apparatus 1 executes the semantic classification estimation process (step S2) for estimating the semantic classification of words (morphemes) in the documents, according to the processing results in step S1 and in step S12. The process of step S2 is executed by the word classification unit 103. The word classification unit 103 executes the process of estimating the semantic classification of respective words in a document, for all the documents included in the multi-language document group 2. The word classification unit 103 executes, for each word, a process for calculating the probability distribution with respect to each of a plurality of semantic classifications, as a process for estimating the semantic classification of the word. In addition, the word classification unit 103 updates, according to the result of estimation of semantic classification of a word, the result of estimation of semantic classification for a corresponding word in a corresponding document in another language. Here, a corresponding document in another language is a document in another language which contains a subject matter that corresponds to that of the document for which the estimation of semantic classification of words is being performed. A corresponding word is a word in a corresponding document in another language that corresponds to a word in the document for which the estimation of semantic classification of words is being performed.

The semantic classification estimation process (step S2) in the process described above that is executed by the parallel-translation dictionary creating apparatus 1 is executed by the word classification unit 103. The word classification unit 103 executes, as the process of step S2, processes presented in FIG. 3, FIG. 4A, and FIG. 4B, for example.

Next, the parallel-translation dictionary creating apparatus 1 creates the semantic-classification-based corpus 111 in which words in the documents are put together for each semantic classification, according to the processing result in step S2 (step S3). The process of step S3 is executed by the corpus dividing unit 104.

Next, a parallel-translation dictionary creating apparatus 1 calculates the probability of correspondence for word pairs across multiple languages according to the semantic-classification-based corpus 111 created in step S3 (step S4). The process of step S4 is executed by the probability-of-correspondence calculation unit 105. The probability-of-correspondence calculation unit 105 calculates the probability of correspondence for each word pair according to a known probability calculation method, for example.

Next, the parallel-translation dictionary creating apparatus 1 calculates a score that represents the likelihood of being parallel-translation words for a word pair, according to the probability of correspondence for the word pair calculated in step S4 (step S5). The process of step S5 is executed by the evaluation unit 106. The evaluation unit 106 calculates the score that represents the likelihood of being parallel-translation words for a word pair (in other words, a score that represents the accuracy with which a pair of words are correct parallel-translation words) according to a known calculation method.

Next, parallel-translation dictionary creating apparatus 1 selects parallel-translation words according to the score calculated in step S5 and registers them in the parallel-translation dictionary (step S6). The process in step S6 is executed by the evaluation unit 106. The evaluation unit 106 selects word pairs for which the score calculated in step S5 is equal to or higher than a threshold, or a prescribed number of word pairs for which the calculated score is high, for example, and registers the word pairs in the parallel-translation dictionary.

The parallel-translation word list creation process (step S12) in the processes described above executed by the parallel-translation dictionary creating apparatus 1 is executed by the list creating unit 107. The list creating unit 107 executes processes in FIG. 17 as the process of step S12, for example.

Figure 17:
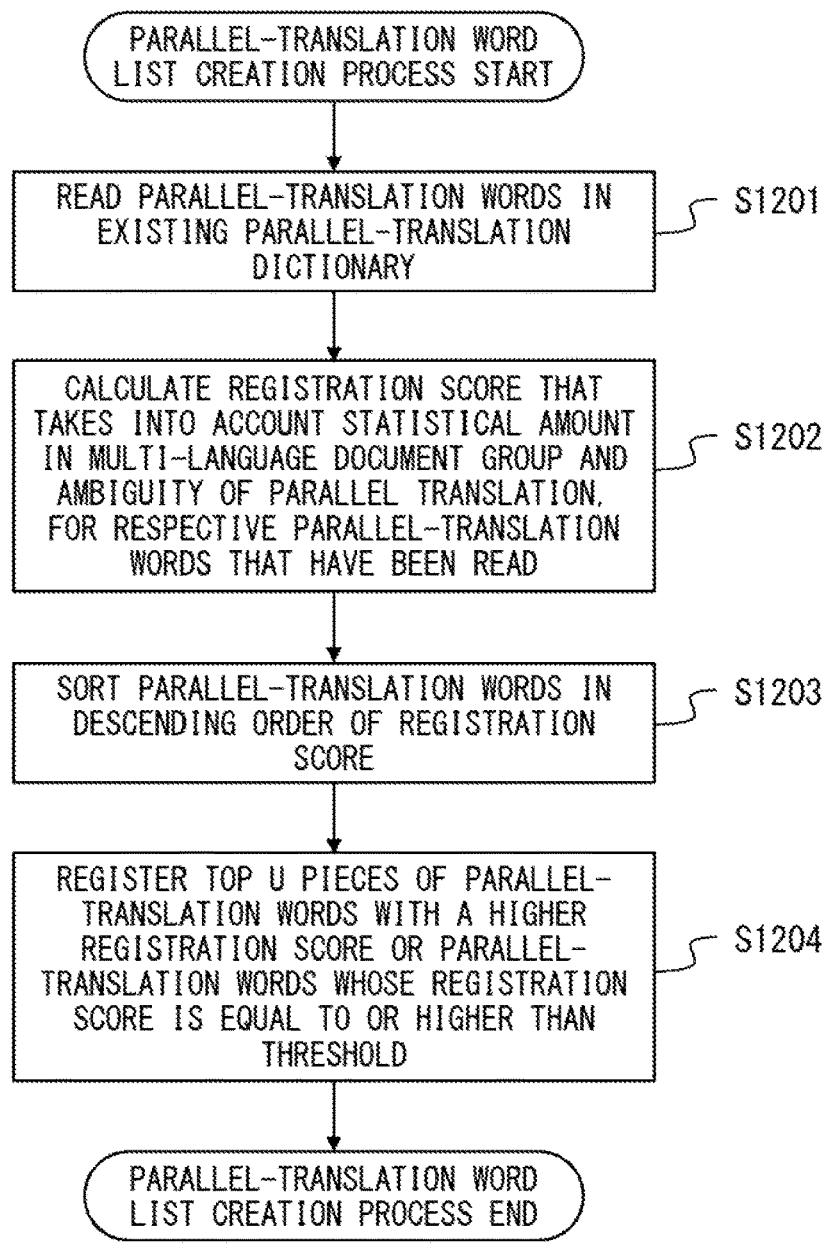
FIG. 17 is a flowchart explaining details of a parallel-translation word list creation process.

FIG. 17 is a flowchart explaining details of the parallel-translation word list creation process.

In the parallel-translation word list creation process (step S12), a registration score that takes into account the statistics in the multi-language document group 2 and the ambiguity in parallel translation is calculated, for the respective parallel-translation words in the existing parallel-translation dictionary. In the parallel-translation word list creation process, the list creating unit 107 first reads parallel-translation words in the existing parallel-translation dictionary 113, as described in FIG. 17 (step S1201).

Next, the list creating unit 107 calculates the registration score that takes into account the statistics in the multi-language document group 2 and the ambiguity in parallel translation, for the respective parallel-translation words that have been read (step S1202). Here, the statistical amount in the multi-language document group 2 is a tf-idf value that is calculated based on two indices term frequency (tf) and inverse document frequency (idf) of the word, for example. In step S1202, the list creating unit 107 calculates the registration score $S_i$ of parallel-translation words $t_i$ registered in the existing parallel-translation dictionary 113 according to the formula (1) below, for example.

$$S_i = \frac{\sum_j g(t_i^J, t_i^E, d_j)}{|D|} \cdot \sum_{l \in \{E,J\}} \left( \sum_j \frac{n_{i,j}^l}{\sum_k n_{k,j}^l} \right) \log \frac{|D|}{|\{d : t_i^l \in d\}|} \quad (1)$$

In the formula (1), $n_{i,j}^l / \Sigma_k n_{k,j}^l$ is the tf value for the parallel-translation words $t_i^l$ of a document pair $d_j$. $n_{i,j}^l$ is the appearance count of the parallel-translation words $t_i^l$ in the document pair $d_j$, and $\Sigma_k n_{k,j}^l$ is the sum of the appearance counts of all the words in document pair $d_j$. Meanwhile, $\log(|D|/|\{d:t_i^l \in d\}|)$ in the formula (1) is the idf value with respect to the parallel-translation words $t_i^l$ in the document pair $d_j$. $|D|$ is the total number of the document pairs, and $|\{d:t_i^l \in d\}|$ is the number of documents that include the word $t_i^l$. Further, $g(t_i^J, t_i^E, d_j)$ in the formula (1) is a value that represents the ambiguity of the parallel-translation words $(t_i^J, t_i^E)$ in the document $d_j$. When there is ambiguity, $g(t_i^J, t_i^E, d_j)=0$, and when there is no ambiguity, $g(t_i^J, t_i^E, d_j)=1$.

After calculating the registration score, the list creating unit 107 sorts the parallel-translation words in descending order of the registration score (step S1203) and registers the top U pieces of parallel-translation words with a higher registration score, or parallel-translation words whose registration score is equal to or higher than a threshold (step S1204).

Upon finishing the process of step S1204, the list creating unit 107 terminates the parallel-translation word list creation process and notifies the control unit 103E of the word classification unit that the creation of the parallel-translation word list 103D has been finished. Upon receiving the notification from the list creating unit 107, the word classification unit 103 executes the semantic classification estimation process presented in FIG. 3, FIG. 4A, and FIG. 4B, for example.

FIGS. 18A and 18B are diagrams presenting an example of an existing parallel-translation dictionary and an example of a created parallel-translation word list.

FIG. 18A presents an existing parallel-translation dictionary 113 in which sets of words in a Japanese document and words in the English document in a parallel translation relationship are registered. In the existing parallel-translation dictionary 113 presented in FIG. 18A, for example, as Japanese words that are in a parallel translation relationship with the word "adult" in English, three Japanese words that are Romanized as "Seijin", "Otona", and "Seinen" are registered. Meanwhile, as Japanese words that are in a parallel translation relationship with the word "tank" in English, three Japanese words that are Romanized as "Tanku", "Sensya", and "Sou" are registered. As described above, as parallel-translation words in the existing parallel-translation dictionary 113 according to the present embodiment, a set of the parallel-translation words does not have to include a Japanese word and an English word as one-to-one. Meanwhile, although not presented in the existing parallel-translation dictionary 113 in FIG. 18A, a set of parallel-translation words may be a set of a Japanese word and a plurality of English words.

The list creating unit 107 calculates the registration score $S_i$ of the parallel-translation word $t_i$ registered in the existing parallel-translation dictionary according to the formula (1), for example. As described above, $g(t'_i, t^E_i, d_j)$ in the formula (1) is a value that represents the ambiguity of the parallel-translation words $(t'_i, t^E_i)$ in the document $d_j$. The ambiguity of the parallel-translation words $(t'_i, t^E_i)$ is determined according to whether or not there are multiple patterns of relationships of parallel translation for one word in one document. The list creating unit 107 sets $g(t'_i, t^E_i, d_j)=0$ when there is ambiguity in the parallel-translation word $t_i$ and sets $g(t'_i, t^E_i, d_j)=1$ when there is no ambiguity in the parallel-translation words $(t'_i, t^E_i)$.

For example, of the two words "tank" in the English sentence "XXX type of tank is supplied with the tank of 100 L.", one corresponds to a Japanese word that is Romanized as "Sensya", and the other corresponds to a Japanese word that is Romanized as "Tanku", meaning a container. For this reason, in the English document that includes the English sentence "XXX type of tank is supplied with the tank of 100 L." above, it is impossible to uniquely determine a Japanese word that is in a parallel translation relationship with "tank" in English. Therefore, the list creating unit 107 determines that there is ambiguity in the parallel translation relationship for English "tank" in the English sentence above, and calculates the registration score $S_i$ while assuming $g(t'_i, t^E_i, d_j)=0$. Meanwhile, when the Japanese word that is in a parallel translation relationship with "tank" in an English document is identified as only one of the three words that are Romanized as "Tanku", "Sensya", and "Sou", the list creating unit 107 determines that there is no ambiguity in the parallel translation relationship for English "tank" in the English document above. When there is no ambiguity in the parallel translation relationship for English "tank", the list creating unit 107 calculates the registration score $S_i$ while assuming $g(t'_i, t^E_i, d_j)=1$.

As described above, by calculating, for the respective parallel-translation words in the existing parallel-translation dictionary 113, the registration score while taking into account the statistics in the multi-language document group and the ambiguity in parallel translation and extracting parallel-translation words whose registration score is higher, a parallel-translation word list 103D that looks like the one presented in FIG. 18B is created, for example. In the formula (1) for calculating the registration score $S_i$, $g(t'_i, t^E_i, d_j)=0$ is set when there is ambiguity in the parallel-translation words $(t'_i, t^E_i)$, and $g(t'_i, t^E_i, d_j)=1$ is set when there is no ambiguity in the parallel-translation words $(t'_i, t^E_i)$. Accordingly, the more documents there are that have no ambiguity in parallel-translation words, the larger the registration score $S_i$ calculated according to the formula (1). Therefore, by estimating the semantic classification of each word in a multi-language document group while referring to the parallel-translation word list 103D in which only the parallel-translation words with a high registration score $S_i$ are registered, it becomes possible to suppress fluctuations in the result of estimation of semantic classification with respect to one word.

Meanwhile, the flowcharts in FIG. 16 and FIG. 17 are merely examples of flowcharts that explain processes executed by the parallel-translation dictionary creating apparatus 1. Processes executed by the parallel-translation dictionary creating apparatus 1 are not limited to the processes mentioned above and changes may be appropriately made without departing from the gist of the present embodiment, such as a change in details of some processes in the semantic classification estimation process (step S2) and in the parallel-translation word list creation process, for example.

<Third Embodiment>

Figure 19:
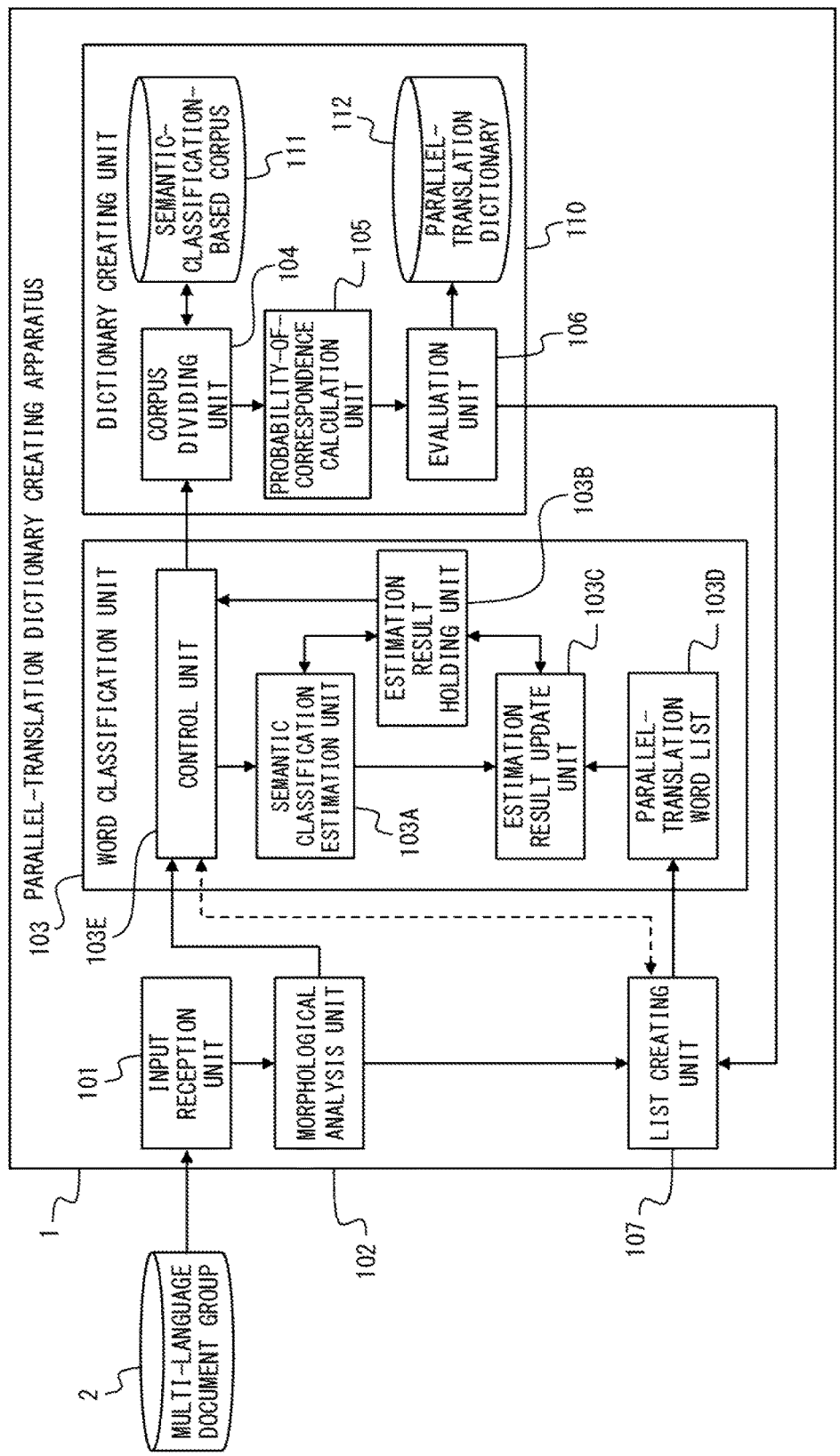
FIG. 19 a diagram illustrating the functional configuration of a parallel-translation dictionary creating apparatus according to the third embodiment.

FIG. 19 is a diagram illustrating a functional configuration of a parallel-translation dictionary creating apparatus according to the third embodiment.

As illustrated in FIG. 19, the parallel-translation dictionary creating apparatus 1 is equipped with an input reception unit 101, a morphological analysis unit 102, a word classification unit 103, a corpus dividing unit 104, a probability-of-correspondence calculation unit 105, an evaluation unit 106, and a list creating unit 107. In addition, the parallel-translation dictionary creating apparatus 1 is equipped with a storing unit (not illustrated in the drawing) that stores various data including a semantic-classification-based corpus 111, a parallel-translation dictionary 112, and documents of a multi-language document group 2.

The input reception unit 101, the morphological analysis unit 102, the corpus dividing unit 104, the probability-of-correspondence calculation unit 105, and the evaluation unit 106 respectively have the function that is explained in the first embodiment. The corpus dividing unit 104, the probability-of-correspondence calculation unit 105, and the evaluation unit 106 function as a dictionary creating unit 110 that creates a parallel-translation dictionary 112 in which a parallel translation relationship for words across multiple languages is registered, according to the result of estimation of the semantic classification of respective words at the word classification unit 103. The corpus dividing unit 104 creates a semantic-classification-based corpus 111 in which words extracted from each document are put together for each semantic classification according to the result of estimation of the semantic classification by the word classification unit 103. Meanwhile, the evaluation unit 106 according to the present embodiment registers, in a parallel-translation dictionary 112, parallel-translation words according to a score that represents the likelihood of being parallel-translation words for a word pair calculated according to the probability of correspondence for the word pair, and also outputs the calculated score to the list creating unit 107.

The word classification unit 103 has the function explained in the first embodiment. The word classification unit 103 executes the process of estimating the semantic classification of a word and the process for updating the semantic classification of a corresponding word in a corresponding document in another language, according to the flowcharts in FIG. 3, FIG. 4A, and FIG. 4B, for example.

In the same manner as the word classification unit 103 according to the first embodiment, the word classification unit 103 in the parallel-translation dictionary creating apparatus 1 of the present embodiment includes a semantic classification estimation unit 103A, an estimation result holding unit 103B, an estimation result update unit 103C, a parallel-translation word list 103D, and a control unit 103E. Each of the units 103A-103C of the word classification unit 103 in the parallel-translation dictionary creating apparatus 1 of the present embodiment has the function explained in the first embodiment. Meanwhile, the control unit 103E according to the present embodiment performs control of active learning with respect to the parallel-translation word list 103D, in addition to the control of the first loop process and the like explained in the first embodiment.

The list creating unit 107 in the parallel-translation dictionary creating apparatus 1 of the present embodiment creates the parallel-translation wordlist 103D that is to be referred to by the estimation result update unit 103C, according to the multi-language document group 2 and the evaluation result by the evaluation unit 106. The evaluation unit 106 in the parallel-translation dictionary creating apparatus 1 of the present embodiment outputs the score that represents the likelihood of being parallel-translation words for a word pair calculated according to the probability of correspondence for the word pair to the list creating unit 107. The list creating unit 107 registers word pairs with a higher score in the parallel-translation word list 103D, according to the score that represents the likelihood of being parallel-translation words for a word pair received from the evaluation unit 106.

Figure 20:
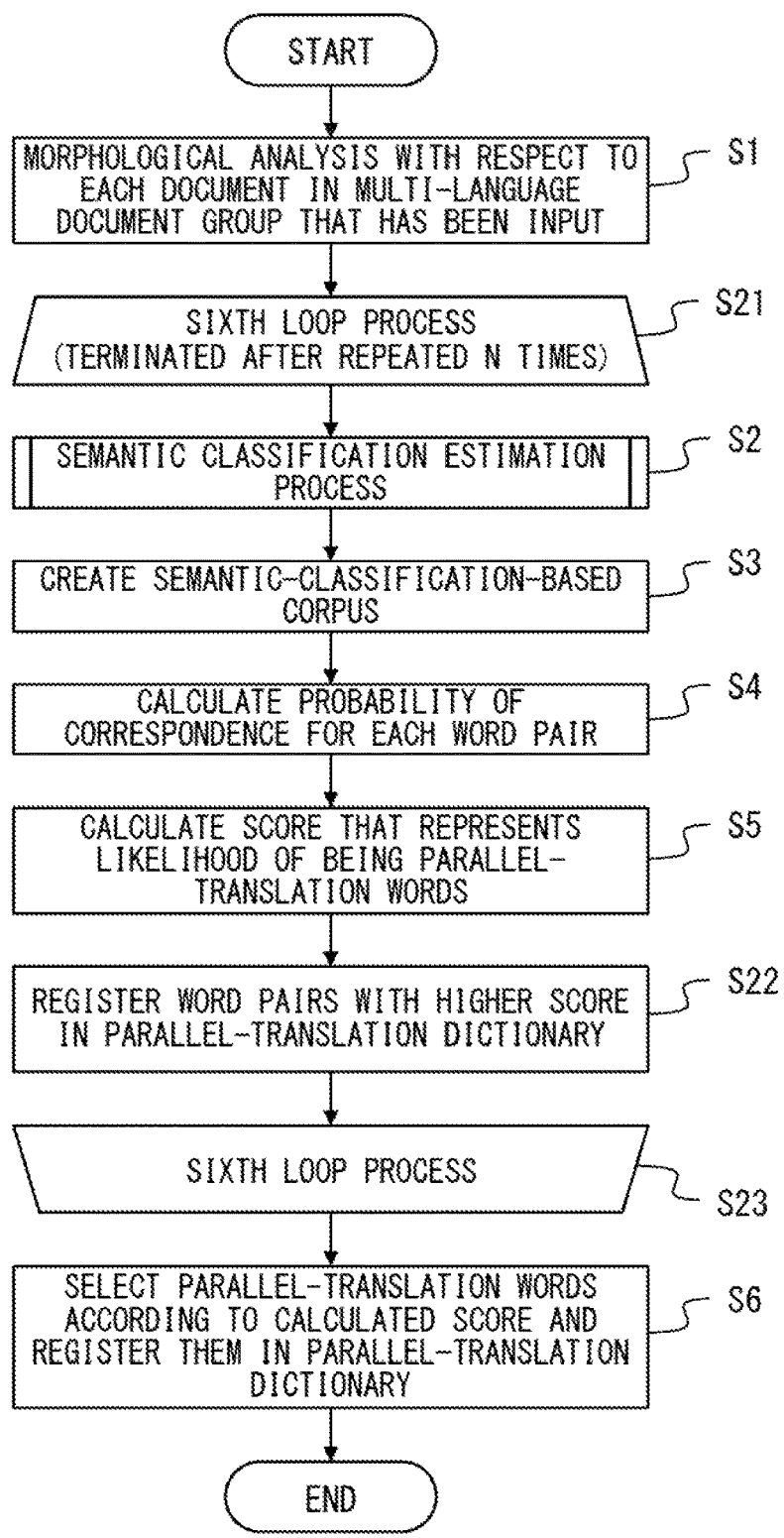
FIG. 20 is a flowchart explaining processes executed by a parallel-translation dictionary creating apparatus according to the third embodiment.

The parallel-translation dictionary creating apparatus 1 executes processes illustrated in FIG. 20 when, for example, the operator inputs a multi-language document group and inputs an order to start the creation of a parallel-translation dictionary.

FIG. 20 is a flowchart explaining processes executed by the parallel-translation dictionary creating apparatus according to the third embodiment.

As illustrated in FIG. 20, the parallel-translation dictionary creating apparatus 1 of the present embodiment first performs a morphological analysis with respect of each of the documents included in the multi-language document group 2 that has been input (step S1). The process of step S1 is executed by the morphological analysis unit 102. The parallel-translation dictionary creating apparatus 1 receives, by the input reception unit 101, the input of the respective documents of the multi-language document group 2 and passes the input documents to the morphological analysis unit 102. The morphological analysis unit 102 divides the sentences of the respective documents into morphemes (words) according to a known method of morphological analysis for a document.

Next, parallel-translation dictionary creating apparatus 1 executes a sixth loop process (steps S21-S23) that is terminated when a process in which the semantic classification of words is estimated is repeated a prescribed number of times, a score that represents the likelihood of being parallel-translation words is calculated, and a word pair with a high score are registered in the parallel-translation word list 103D.

The sixth loop process is controlled by the control unit 103E of the word classification unit 103. The control unit 103E adds 1 to a variable that represents the number of processes every time a series of processes (steps S2-S5, and S22) ends that includes the estimation of the semantic classification of words, the calculation of the score that represents the likelihood of being parallel-translation words, and the registration of a word pair with a higher score in the parallel-translation word list 103D. Then, when the value of the variable becomes larger than a prescribed value (number of times), the control unit 103E terminates the sixth loop process. Meanwhile, the number of processes that is to be the termination condition for the sixth loop process may be appropriately set, and it may be a fixed value that is determined in advance, or may be set by the operator at a time such as when starting the creation process for the parallel-translation dictionary, for example.

In the sixth loop process, as described above, a series of processes (step S2-S5, and S22) including the estimation of the semantic classification of words, the calculation of a score that represents the likelihood of being parallel-translation words, and the registration of a word pair with higher scores in the parallel-translation word list 103D are repeated a prescribed times.

In one round (one loop) of processing in the sixth loop process, first, the semantic classification estimation process (step S2) is executed for estimating the semantic classification of words (morphemes) in the documents, according to the processing result for step S1 and the parallel-translation word list 103D. The process of step S2 is executed by the word classification unit 103. The word classification unit 103 executes the process of estimating the semantic classification of respective words in a document, for all the documents included in the multi-language document group 2. The word classification unit 103 executes, for each word, a process for calculating the probability distribution with respect to each of a plurality of semantic classifications, as a process for estimating the semantic classification of the word. In addition, the word classification unit 103 updates, according to the result of estimation of semantic classification of a word, the result of estimation of semantic classification for a corresponding word in a corresponding document in another language. Here, a corresponding document in another language is a document in another language which contains a subject matter that corresponds to that of the document for which the estimation of semantic classification of words is being performed. A corresponding word is a word in a corresponding document in another language that corresponds to a word in the document for which the estimation of semantic classification of words is being performed.

The semantic classification estimation process (step S2) in the processes described above executed by the parallel-translation dictionary creating apparatus 1 is executed by the word classification unit 103. The word classification unit 103 executes processes described in FIG. 3, FIG. 4A, and FIG. 4B as the process of step S2, for example.

Next, the parallel-translation dictionary creating apparatus 1 creates the semantic-classification-based corpus 111 in which words in the documents are put together for each semantic classification, according to the processing result in step S2 (step S3). The process of step S3 is executed by the corpus dividing unit 104.

Next, parallel-translation dictionary creating apparatus 1 calculates the probability of correspondence for word pairs across multiple languages according to the semantic-classification-based corpus 111 created in step S3 (step S4). The process of step S4 is executed by the probability-of-correspondence calculation unit 105. The probability-of-correspondence calculation unit 105 calculates the probability of correspondence for each word pair according to a known probability calculation method, for example.

Next, the parallel-translation dictionary creating apparatus 1 calculates a score that represents the likelihood of being parallel-translation words for a word pair, according to the probability of correspondence for the word pair calculated in step S4 (step S5). The process of step S5 is executed by the evaluation unit 106. The evaluation unit 106 calculates the score that represents the likelihood of being parallel-translation words for a word pair (in other words, a score that represents the accuracy with which a pair of words are correct parallel-translation words) according to a known calculation method.

Next, the parallel-translation dictionary creating apparatus 1 registers a word pair with a higher score in the corresponding word list, according to the score calculated in step S5 (step S22). The process of step S22 is executed by the list creating unit 107. The list creating unit 107 registers, in the parallel-translation word list 103D, the word pair whose score that represents the likelihood of being parallel-translation words is the largest among word pairs that are not registered in the parallel-translation word list 103D, for example.

When the process for registering a word pair in the corresponding word list ends, the control unit 103E of the word classification unit 103 updates the number of times the series of processes of step S2-S6, and S22 have been executed. Then, when the number of times the processes have been executed is smaller than a prescribed number, the sixth loop process is continued, and when the number of times the processes have been executed reaches the prescribed number, the sixth loop process is terminated.

Upon terminating the sixth loop, the parallel-translation dictionary creating apparatus 1 selects parallel-translation words according to the score calculated in step S5 and registers them in the parallel-translation dictionary (step S6). The process in step S6 is executed by the evaluation unit 106. The evaluation unit 106 selects word pairs for which the score calculated in step S5 is equal to or higher than a threshold, or a prescribed number of word pairs for which the calculated score is high, for example, and registers the word pairs in the parallel-translation dictionary.

As described above, the parallel-translation dictionary creating apparatus 1 according to the present embodiment decides the word pair (the parallel-translation words) to be registered in the parallel-translation word list 103D according to the score that represents the likelihood of being parallel-translation words for a word pair that is calculated from the result of the semantic classification estimation process with respect to the words in the documents of the multi-language document group 2. Further, the parallel-translation dictionary creating apparatus 1 according to the present embodiment decides the word pair to be registered in the parallel-translation dictionary after repeating a plurality of times the series of processes from the process for estimating semantic classification and the process for registering a word pair in the parallel-translation word list 103D. That is, the parallel-translation dictionary creating apparatus 1 according to the present embodiment performs active learning for the parallel-translation words (word pairs) in the parallel-translation word list 103D in the course of registering word pairs selected according to the result of the semantic classification estimation process with respect to the words in the documents of the multi-language document group 2.

FIG. 21A-21E are diagrams explaining the progress of active learning of parallel-translation words.

FIG. 21A presents an example of the parallel-translation word list 103D at the point in time when the creating process for the parallel-translation dictionary according to the present embodiment starts. That is, the creating process for the parallel-translation dictionary according to the present embodiment may be started in a state in which no parallel-translation words are registered in the parallel-translation word list 103D. When the creating process for the parallel-translation dictionary is started in a state in which no parallel-translation words are registered in the parallel-translation word list 103D, in the estimation result update process (step S206) executed in the first round of the semantic classification estimation process (step S2), the determination result in step S206C becomes "No" for all the words. That is, in the first round of the semantic classification estimation process (step S2), the estimation result update process is not executed.

After the first round of the semantic classification estimation process is finished, by executing the processes of step S3-S5 according to the processing result, a result that looks like a table 431 presented in FIG. 21B is obtained for the respective scores that represent the likelihood of being parallel-translation words for word pairs, for example. Meanwhile, in the table 431, the word pairs have been sorted in descending order of the score that represents the likelihood of being parallel-translation words. The field for Japanese for the word pairs in the table 431 contains seven Japanese words that are Romanized as "Hakuoh", "Amerika", "Mongoru", "Harukafuji", "Gikai", "Syounin", and "Make", in order from the top.

When the process of step S5 is finished, the evaluation unit 106 passes the respective scores that represent the likelihood of being parallel-translation words for word pairs (the table 431) to the list creating unit 107. Upon receiving the respective scores that represent the likelihood of being parallel-translation words for word pairs (the table 431), the list creating unit 107 registers the word pair whose score is the highest among word pairs that are not registered in the parallel-translation word list 103D (step S22). Accordingly, in the first round of processes of step S22, the word pair whose score is the highest among all the word pairs in the table 431 in FIG. 21B becomes the target of registration in the parallel-translation word list 103D. Therefore, in the first round of processes of step S22, as presented in FIG. 21C, the word pair of the Japanese word Romanized as "Hakuoh" and the English word "Hakuoh" is registered in the parallel-translation word list 103D.

When the first round of the process of step S22 is finished, the word classification unit 103 of the parallel-translation dictionary creating apparatus 1 executes the second round of a word meaning estimation process. In the estimation result update process in the second round of the word meaning estimation process, the estimation result update unit 103C of the word classification unit 103 refers to the parallel-translation word list 103D (FIG. 21C) in which the word pair of the Japanese word Romanized as "Hakuoh" and the English word "Hakuoh" is registered. Accordingly, when the multi-language document group 2 includes a document pair of a Japanese document that includes the Japanese word Romanized as "Hakuoh" and an English document that includes the word "Hakuoh", the semantic classification is updated in the estimation result update process.

After the second round of the semantic classification estimation process is finished, by executing the processes of step S3-S5 according to the processing result, a result that looks like a table 432 presented in FIG. 21D is obtained, as the respective scores that represent the likelihood of being parallel-translation words for word pairs, for example. Meanwhile, in the table 432, the word pairs have been sorted in descending order of the score that represents the likelihood of being parallel-translation words. The field for Japanese for the word pairs in the table 432 contains seven Japanese words that are Romanized as "Hakuoh", "Harukafuji", "Amerika", "Gikai", "Mongoru", "Syounin", and "Make", in order from the top.

When the second round of the process of step S5 is finished, the evaluation unit 106 passes the respective scores that represent the likelihood of being parallel-translation words for word pairs (the table 432) to the list creating unit 107. Upon receiving the respective scores that represent the likelihood of being parallel-translation words for word pairs (the table 432), the list creating unit 107 registers the word pair whose score is the highest among word pairs that are not registered in the parallel-translation word list 103D (step S22). At the point in time when the second round of the process of step S22 is performed, as presented in FIG. 21, the word pair of the Japanese word Romanized as "Hakuoh" and the English word "Hakuoh" is registered in the parallel-translation word list 103D. Accordingly, in the second round of processes of step S22, the word pair of the Japanese word Romanized as "Hakuoh" and "Hakuoh" in English among all the word pairs in the table 431 is excluded from the target of registration in the parallel-translation wordlist 103D. In the table 432, the score of the word pair of the Japanese word Romanized as "Hakuoh" and "Hakuoh" in English is the highest, but the word pair has already been registered in the parallel-translation word list 103D. Accordingly, in the second round of the process of step S22, the list creating unit 107 excludes the word pair of the Japanese word Romanized as "Hakuoh" and "Hakuoh" in English in the table 432 from the target of registration in the parallel-translation word list 103D. Therefore, in the second round of the process of step S22, as presented in FIG. 21E, the list creating unit 107 registers, in the parallel-translation word list 103D, the word pair of the Japanese word Romanized as "Harukafuji" and "Harukafuji" in English whose score is the second highest in the table 432

After finishing the second round of the process of step S22, the parallel-translation dictionary creating apparatus 1 repeats the series of processes of steps S2-S5, and S22 until reaching a prescribed number of times. During this period, every time the process of step S22 is finished, a new set of parallel-translation words (word pair) is added to the parallel-translation word list 103D. Then, the series of processes of steps S2-S5, and S22 have been repeated a prescribed number of times, and the evaluation unit 106 of the parallel-translation dictionary creating apparatus 1 registers the word pair with a higher score in the parallel-translation dictionary, according to the latest processing result in step S5.

As described above, the parallel-translation dictionary creating apparatus 1 performs active learning for the parallel-translation words (word pairs) in the parallel-translation word list 103D in the process of registering word pairs selected according to the result of the semantic classification estimation process with respect to the words in the documents of the multi-language document group 2. That is, according to the present embodiment, it becomes possible to execute the estimation process and the update process for semantic classification based on the parallel-translation word list 103D, without using the existing parallel-translation dictionary 113. Further, the active learning for the parallel-translation words in the parallel-translation word list 103D is performed based on the result of the semantic classification estimation process with respect to the words in the documents of the multi-language document group 2, and therefore, it becomes possible to create the parallel-translation word list 103D that reflects the context in the documents of the multi-language document group and the characteristics of a parallel translation relationship for corresponding words. Therefore, according to the present embodiment, it becomes possible to create a parallel-translation dictionary 112 in which parallel translation words (word pairs) in more appropriate parallel translation relationships are registered according to the content of the documents of the multi-language document group 2.

Meanwhile, the flowchart in FIG. 20 is merely an example of a flowchart that explains processes executed by the parallel-translation dictionary creating apparatus 1. Processes executed by the parallel-translation dictionary creating apparatus 1 are not limited to the processes mentioned above and changes may be appropriately made without departing from the gist of the present embodiment, such as a change in details of some processes in the semantic classification estimation process (step S2) and in the process for registering the word pair in the parallel-translation word list 103D, for example.

In addition, in the present embodiment, an example of registering one set of a word pair in the parallel-translation word list 103D in one round of the process of step S22 is provided, but without being limited to this, two or more sets of word pairs may be registered in the parallel-translation word list 103D in one round of the process of step S22. Further, in the process of step S22, the score being equal to or higher than a threshold may be added to the conditions for the registration in the parallel-translation word list 103D.

<Fourth Embodiment>

Figure 22:
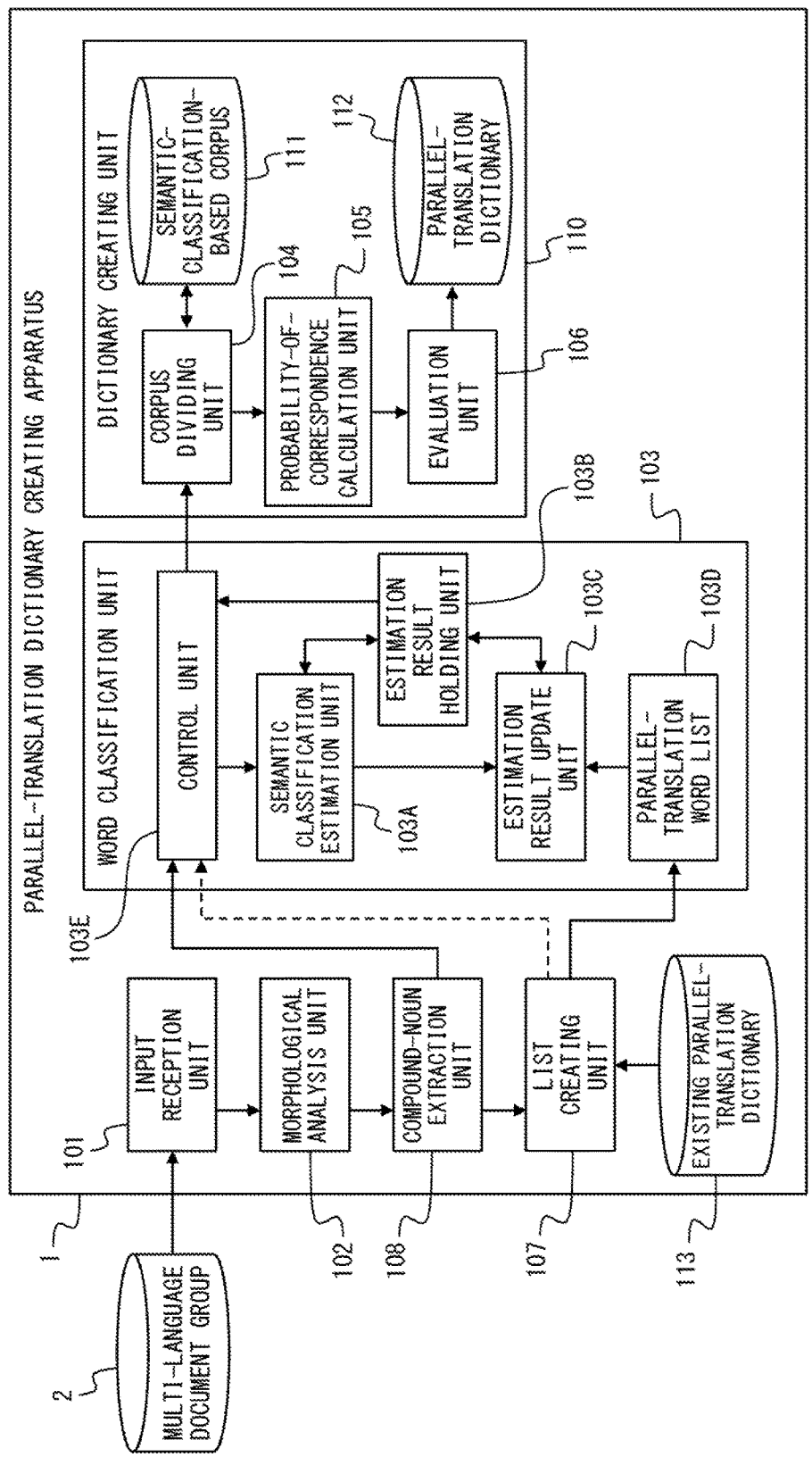
FIG. 22 is a diagram illustrating the functional configuration of a parallel-translation dictionary creating apparatus according to the fourth embodiment.

FIG. 22 is a diagram illustrating the functional configuration of a parallel-translation dictionary creating apparatus according to the fourth embodiment.

As illustrated in FIG. 22, the parallel-translation dictionary creating apparatus 1 according to the present embodiment is equipped with an input reception unit 101, a morphological analysis unit 102, a word classification unit 103, a corpus dividing unit 104, a probability-of-correspondence calculation unit 105, an evaluation unit 106, and a list creating unit 107. In addition, the parallel-translation dictionary creating apparatus 1 is equipped with a storing unit (not illustrated in the drawing) that stores various data including a semantic-classification-based corpus 111, a parallel-translation dictionary 112, an existing parallel-translation dictionary 113, and documents of a multi-language document group 2. Further, the parallel-translation dictionary creating apparatus 1 according to the present embodiment is equipped with a compound noun extraction unit 108.

The input reception unit 101, the morphological analysis unit 102, the corpus dividing unit 104, the probability-of-correspondence calculation unit 105, and the evaluation unit 106 respectively have the function that is explained in the first embodiment. The corpus dividing unit 104, the probability-of-correspondence calculation unit 105, and the evaluation unit 106 function as a dictionary creating unit 110 that creates a parallel-translation dictionary 112 in which a parallel translation relationship for words across multiple languages is registered, according to the result of estimation of the semantic classification of each word at the word classification unit 103. Meanwhile, the list creating unit 107 creates a parallel-translation word list 103D according to the words (morphemes) extracted by morphological analysis with respect to each document of the multi-language document group 2 and the existing parallel-translation dictionary 113.

The word classification unit 103 has the function explained in the first embodiment. The word classification unit 103 executes the process of estimating the semantic classification of a word and the process for updating the semantic classification of a corresponding word in a corresponding document in another language, according to the flowcharts in FIG. 3, FIG. 4A, and FIG. 4B, for example.

In the same manner as the word classification unit 103 according to the first embodiment, the word classification unit 103 in the parallel-translation dictionary creating apparatus 1 of the present embodiment includes a semantic classification estimation unit 103A, an estimation result holding unit 103B, an estimation result update unit 103C, a parallel-translation word list 103D, and a control unit 103E. Each of the units 103A-103C, and 103E of the word classification unit 103 in the parallel-translation dictionary creating apparatus 1 of the present embodiment has the function explained in the first embodiment.

The compound noun extraction unit 108 in the parallel-translation dictionary creating apparatus 1 of the present embodiment extracts compound nouns in documents according to the result of morphological analysis with respect to each document of the multi-language document group 2. The compound noun extraction unit 108 makes a plurality of consecutive words that correspond to a compound noun into a single word, according to the relationship between the part of speech of the plurality of consecutive words (morphemes) and the semantic structure of the sentence. That is, in the present embodiment, a plurality of consecutive words that correspond to a compound noun is treated as a single word, and the creation of the parallel-translation word list 103D and the estimation of semantic classification and the like are performed.

Figure 23:
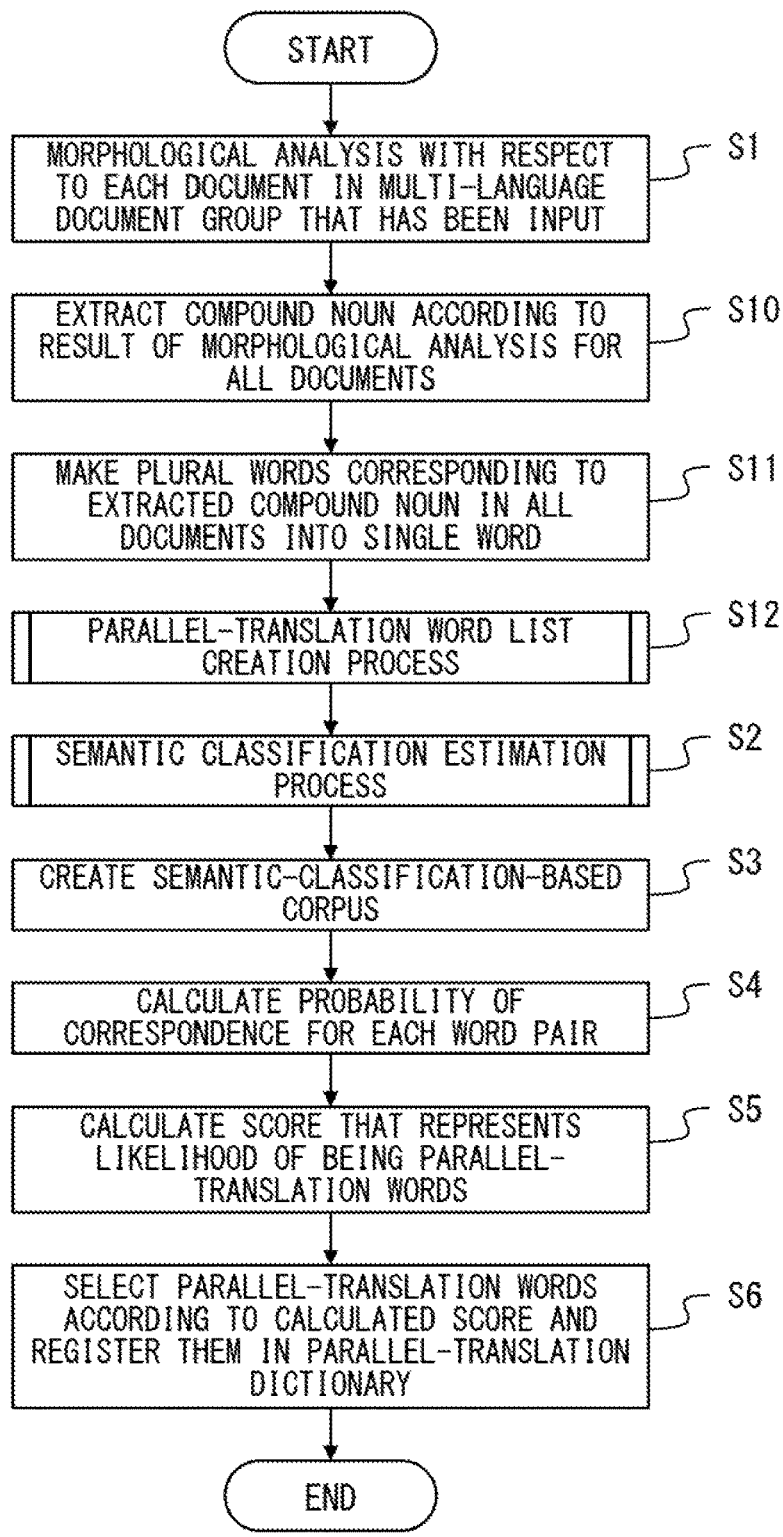
FIG. 23 is a flowchart explaining processes executed by a parallel-translation dictionary creating apparatus according to the fourth embodiment.

The parallel-translation dictionary creating apparatus 1 executes the processes illustrated in FIG. 23 when, for example, the operator inputs a multi-language document group 2 and inputs an order to start the creation of a parallel-translation dictionary.

FIG. 23 is a flowchart explaining processes executed by the parallel-translation dictionary creating apparatus according to the fourth embodiment.

As described in FIG. 23, the parallel-translation dictionary creating apparatus 1 of the present embodiment first performs a morphological analysis with respect of each of the documents included in the multi-language document group 2 that has been input (step S1). The process of step S1 is executed by the morphological analysis unit 102. The parallel-translation dictionary creating apparatus 1 receives, by the input reception unit 101, the input of the respective documents of the multi-language document group 2 and passes the input documents to the morphological analysis unit 102. The morphological analysis unit 102 divides the sentences of the respective documents into morphemes (words) according to a known method of morphological analysis for a document.

Next, the parallel-translation dictionary creating apparatus 1 extracts a compound noun according to the result of morphological analysis for all the documents in step S1 (step S10). The process in step S10 is executed by the compound noun extraction unit 108. The compound noun extraction unit 108 extracts a set of a plurality of consecutive words (morphemes) that satisfy the condition of a compound noun, according to a known extraction method.

After step S10, the compound noun extraction unit 108 makes a plurality of words that correspond to the extracted compound noun in all the documents into a single word (step S11). In step S11, the compound noun extraction unit 108 combines a plurality of words (morphemes) in the documents that correspond to the compound noun into a single word (morpheme).

After finishing the processes in step S10 and S11, the parallel-translation dictionary creating apparatus 1 executes a parallel-translation word list creation process (step S12) for creating the parallel-translation word list 103D based on the processing result in step S11 and the existing parallel-translation dictionary 113. The process of step S12 is executed by the list creating unit 107. The list creating unit 107 executes the process presented in FIG. 17 as the process of step S12, for example. Meanwhile, in the process of step S12 according to the present embodiment, the list creating unit 107 treats a set of a plurality of consecutive words that satisfy conditions of a compound noun as a single word (compound noun).

Next, the parallel-translation dictionary creating apparatus 1 executes a parallel-translation word list creation process (step S12) for creating the parallel-translation word list 103D according to the processing result for step S11 and the existing parallel-translation dictionary 113. The process of step S12 is executed by the list creating unit 107. The list creating unit 107 calculates a registration score that takes into account the statistics in the multi-language document group and the ambiguity in parallel translation, for the respective parallel-translation words in the existing parallel-translation dictionary 113. After calculating the registration score, the list creating unit 107 registers, in the parallel-translation word list 103D, the parallel-translation words whose score is high.

Next, the parallel-translation dictionary creating apparatus 1 executes the semantic classification estimation process (step S2) for estimating the semantic classification of words (morphemes) in the document, according to the processing results in step S11 and step S12. The process of step S2 is executed by the word classification unit 103. The word classification unit 103 executes the processes presented in FIG. 3, FIG. 4A, and FIG. 4B as the process of step S2, for example. Meanwhile, in the process of step S2 according to the present embodiment, the word classification unit 103 treats a set of a plurality of consecutive words that satisfy conditions of a compound noun as a single word (compound noun).

After the process of step S2, the parallel-translation dictionary creating apparatus 1 executes the processes of steps S3-S6 explained in the first embodiment. The process of step S3 is executed by the corpus dividing unit 104. The process of step S4 is executed by the probability-of-correspondence calculation unit 105. The processes of steps S5 and S6 are executed by the evaluation unit 106.

FIGS. 24A-24F are diagrams explaining an example of a process of extracting a compound noun and making it into a single word.

FIG. 24A presents a Japanese document 201 that is one of the documents included in the multi-language document group 2. The Japanese document 201 contains sentences written in Japanese whose subject matter is that Mr. Larry Clapton, who is very popular in the United States, and Sumo grand champion Harukafuji carried out talks for the establishment of the United States Sumo Association.

By performing morphological analysis with respect to the Japanese document 201, a first analysis result 451 presented in FIG. 24B is obtained, for example. In the first analysis result 451, "/" indicates a partition between morphemes (words).

In the process of step S10, when extracting a compound noun from the first analysis result 451, the compound noun extraction unit 108 extracts a portion such as a portion in which there are a plurality of consecutive words whose part of speech is noun, as a word group that satisfies the condition of a compound noun (step S10). From the first analysis result 451, three word groups are extracted as in a table 452 presented in FIG. 24, for example. In the three word groups presented in the table 452, the word group put in the top level is a word group that includes three Japanese words that are Romanized as "Jiki/Daitouryo/Kouho". The word group is a Japanese compound noun that corresponds to "a candidate for the next President of the United States" in English. The word group that is put at the middle level in the three word groups presented in the table 452 is a word group that includes two Japanese words that are Romanized as "Ryogoku/Kokugikan". The word group is a Japanese compound noun in which the name of a place "Ryogoku" and the name of a facility "Kokugikan" are combined. The word group that is put in the bottom level in the three word groups presented in the table 452 is a word group that includes three Japanese words that are Romanized as "Amerika/Sumou/Kyoukai". The word group is a Japanese compound noun that corresponds to "an association in the United States related to Sumo" in English.

After extracting word groups that satisfy the condition of a compound noun, the compound noun extraction unit 108 changes the portion corresponding to the extracted group from a plurality of words (morphemes) to a single word (step S11). By executing the change process with respect to the first analysis result 451 according to the table 452, a second analysis result 453 presented in FIG. 24A(d) is obtained. In the second analysis result 453, the morphemes at the three portions that satisfy the condition of a compound noun are respectively changed into one morpheme.

In the process of step S12 executed next to step S11, the parallel-translation word list 103D is created based on the second analysis result 453. When compound nouns in the documents are extracted as in the present embodiment, it is preferable that the existing parallel-translation dictionary 113 referred to by the list creating unit 107 be a dictionary that includes parallel-translation words (word pairs) for compound nouns. In the process of step S12, the list creating unit 107 executes the processes of step S1201-S1204 presented in FIG. 17, for example. The parallel-translation word list 103D created according to the second analysis result 453 and the existing parallel-translation dictionary 113 looks as presented in FIG. 24E, for example.

After the process of step S12, by executing the processes of step S2-S5 and calculating the score that represents the likelihood of being parallel-translation words for a word pair, a result that looks like a table 454 presented in FIG. 24F is obtained, for example. Therefore, when the score of a word pair of a compound noun is high, the word pair of the compound noun is registered in the parallel-translation dictionary. For example, in a case in which the word pairs which rank from the first to the fifth in the ranking in the table 454 have already been registered in the parallel-translation word list 103D, the word pair that ranks sixth (the pair of a Japanese word that is Romanized as "Jiki-Daitouryo-Kouho" and an English word that corresponds to the Japanese word) is registered in the parallel-translation word list 103D.

As described above, in the present embodiment, a group of a plurality of consecutive words that satisfy the condition of a compound noun in the documents of the multi-language document group 2 are made into a single word (made into a compound noun), the semantic classification of words are estimated, and the parallel-translation dictionary is created according to the estimation results. Accordingly, in a case in which documents included in the multi-language document group 2 are documents of a particular technical field or industry, it becomes possible to extract compound nouns used in the technical field or industry as parallel-translation words and to register them in the parallel-translation dictionary.

Meanwhile, the flowchart in FIG. 23 is merely an example of a flowchart that explains processes executed by the parallel-translation dictionary creating apparatus 1. Processes executed by the parallel-translation dictionary creating apparatus 1 are not limited to the processes mentioned above and changes may be appropriately made without departing from the gist of the present embodiment.

<Fifth Embodiment>

FIG. 25 is a diagram illustrating a configuration example of a translation system according to the fifth embodiment.

As illustrated in FIG. 25, a translation system 6 of the present embodiment includes a parallel-translation dictionary creating apparatus 1, a document server 7, a dictionary server, and a translation server 9.

The document server 7 is a server apparatus that stores multi-language document groups 2A, 2B prepared for respective fields. The dictionary server is a server apparatus that stores parallel-translation dictionaries 112A and 112B for respective fields created at the parallel-translation dictionary creating apparatus 1. The translation server 9 is a server apparatus that translates a document of a first language into a document of a second language using the parallel-translation dictionaries in the dictionary server 8.

The document server 7 and the parallel-translation dictionary creating apparatus 1 are connected to terminal apparatuses 10A and 10B, and the like in a communicable manner via a communication network 11 that is the Internet or the like. For example, the terminals 10A and 10B are terminal apparatuses that are operated by an operator who performs management and maintenance of the translation system 6. The operator operates the terminals 10A and 10B to perform the updating of the multi-language document groups 2A and 2B in the document server 7, the addition of a new multi-language document group, the deletion of a multi-language document group that is no longer needed, and the like. Meanwhile, the terminal apparatuses 10A and 10B operated by the operator are connected to the parallel-translation dictionary creating apparatus 1 in a communicable manner via the communication network 11. When the operator operates the terminals 10A and 10B and transmits information that specifies a multi-language document group and an order to start the creation of a parallel-translation dictionary to the parallel-translation dictionary creating apparatus 1, the parallel-translation dictionary creating apparatus 1 executes the processes explained in one of the first embodiments through the fourth embodiment and creates a parallel-translation dictionary. After that, the parallel-translation dictionary creating apparatus 1 stores the created parallel-translation dictionary in the dictionary server 8.

While omitted in FIG. 25, the dictionary server 8 is connected with the terminal apparatuses 10A and 10B, and the like in a communicable manner via the communication network 11. The operator operates the terminals 10A and 10B and performs the maintenance of the parallel-translation dictionary 112A and 112B in the dictionary server, the deletion of a parallel-translation dictionary that is no longer needed, and the like.

The translation server 9 is connected to a terminal 10Z or the like in a communicable manner via the communication network 11. The user of the terminal 10Z operates the terminal 10Z and transmits a document to be translated, information such as the field of the document, and the like, to the translation server 9. The translation server that has received the document from the terminal 10Z selects a parallel-translation dictionary in the dictionary server 8 according to the information of the field of the document and translates the document. When the translation is completed, the translation server 9 transmits the document after translation to the terminal 10Z. Meanwhile, of course, the terminals 10A and 10B may also be connected to the translation server 9.

In the translation system 6 according to the present embodiment, for example, the parallel-translation dictionaries may be updated at any time by operators of respective departments in a company or participants of various network communities, using the terminals 10A and 10B. In addition, the translation system 6 according to the present embodiment creates the parallel-translation dictionary by means of the parallel-translation dictionary creating apparatus 1 explained in the first embodiment through the fourth embodiment. Accordingly, it becomes possible for the translation system 6 to create and update, at a low cost, a parallel-translation dictionary in which parallel translations of technical terms used in a particular field are registered.

Meanwhile, the translation system 6 in FIG. 25 is merely an example of the translation system according to the present embodiment. Changes may be appropriately made to the translation system 6 without departing from the gist of the present embodiment, such as a change made by storing multi-language document groups and dictionary data in one server apparatus, for example.

The parallel-translation dictionary creating apparatus 1 that executes processes explained in the respective embodiments above may be executed by a computer and a program that the computer is made to execute. Hereinafter, with reference to FIG. 26, the parallel-translation dictionary creating apparatus 1 that is realized using a computer and a program is explained.

FIG. 26 is a diagram illustrating the hardware configuration of a computer.

As illustrated in FIG. 26, a computer 15 is equipped with a processor 1501, a main storage apparatus 1502, an auxiliary storage apparatus 1503, an input apparatus 1504, an output apparatus 1505, an input/output interface 1506, a communication control apparatus 1507, and a medium driving apparatus 1508. These elements 1501-1508 in the computer 15 are mutually connected via a bus 1510, and exchange of data between the elements may be performed.

The processor 1501 is a Central Processing Unit (CPU), a Micro Processing Unit (MPU), or the like. The processor 1501 controls the operations of the entirety of the computer 15 by executing various programs including the operating system. In addition, the processor 1501 executes respective processes presented in FIG. 2, FIG. 3, FIG. 4A, and FIG. 4B, for example.

The main storage apparatus 1502 includes a Read Only Memory (ROM) and a Random Access Memory (RAM) that are not illustrated in the drawing. In the ROM of the main storage apparatus 1502, a prescribed basic control program that is read by the processor 1501 at the time of the start of the computer 15 is recorded in advance. Meanwhile, the RAM of the main storage apparatus 1502 is used as a working memory area as needed when the processor 1501 executes various programs. The RAM of the main storage apparatus 1502 may be used for storing the multi-language document group 2, the result of estimation of semantic classification, the semantic-classification-based corpus 111, and the like, for example.

The auxiliary storage apparatus 1503 is a storage apparatus such as a Hard Disk Drive (HDD) or a non-volatile memory such as a flash memory (including a Solid State Drive(SSD)) that has a larger capacity compared with that of the RAM of the main storage apparatus 1502. The Solid State Drive(SSD) may be used for storing various programs executed by the processor 1501, various data, and the like. The auxiliary storage apparatus 1503 may be used for storing a program that makes the processor 1501 execute respective processes presented in FIG. 2, FIG. 3, FIG. 4A, and FIG. 4B, for example. In addition, the auxiliary storage apparatus 1503 may be used for storing the multi-language document group 2, the result of estimation of semantic classification, the semantic-classification-based corpus 111, the parallel-translation dictionary 112, and the like, for example.

The input apparatus 1504 is a keyboard apparatus, a touch panel apparatus, or the like. When the operator (user) of the computer 15 performs a prescribed operation with the input apparatus 1504, the input apparatus 1504 transmits input information associated with the content of the operation to the processor 1501. The input apparatus 1504 may be used for inputting an order to start one of the processes presented in FIG. 2, FIG. 16, FIG. 20, and FIG. 23, selecting a multi-language document group, and the like.

The output apparatus 1505 includes a display apparatus such as a liquid-crystal display apparatus or the like. The output apparatus 1505 may be used for displaying documents of the multi-language document group 2, displaying a created parallel-translation dictionary, and the like.

The input/output interface 1506 connects the computer 15 with another electronic device. The input/output interface 1506 is equipped with a connector of the Universal Serial Bus (USB) standard or the like, for example.

The communication control apparatus 1507 is an apparatus that connects the computer 15 to the communication network and that controls various communications of the computer 15 and another electronic device via the communication network.

The medium driving apparatus 1508 reads programs and data recorded in a portable recording medium 16 and writes data and the like stored in the auxiliary storage apparatus 1503 into the portable storage medium 16. An optical disk drive may be used as the medium driving apparatus 1508. When using an optical disk drive as the medium driving apparatus 1508, various optical disks that may be recognized by the optical disk drive may be used as the portable recording medium 16. Optical disks that may be used as the portable recording medium 16 include a Compact Disc (CD), a Digital Versatile Disc (DVD), a Blu-ray Disc (Blu-ray is a registered trademark), and the like, for example. In addition, a memory card reader/writer that supports one or a plurality of kinds of standards may be used as the medium driving apparatus 1508. When using a memory card reader/writer as the medium driving apparatus 1508, a memory card (flash memory) or the like of the standard that is supported by the memory card reader/writer, for example, the Secure Digital standard, may be used as the portable storage medium 16. In addition, a flash memory that is equipped with a connector of the USB standard may be used as the portable recording medium 16, for example. The portable recording medium 16 may be used for recording programs that include processes explained in the respective embodiment described above, the multi-language document group, a parallel-translation dictionary, and the like.

When an order to start any of the processes presented in FIG. 2, FIG. 16, FIG. 20, and FIG. 23 is input to the computer 15, the processor 1501 reads and execute a program stored in a non-transitory recording medium such as the auxiliary storage apparatus 1503 or the like. In these processes, the processor 1501 functions (operates) as the morphological analysis unit 102, the semantic classification estimation unit 103A, the estimation result update unit 103C, the control unit 103E, the corpus dividing unit 104, the probability-of-correspondence calculation unit 105, and the evaluation unit 106 in the parallel-translation dictionary creating apparatus 1. In addition, when executing the process in FIG. 16 or FIG. 20, the processor 1501 also functions (operates) as the list creating unit 107, in addition to the respective units mentioned above. Further, when executing the process in FIG. 23, the processor 1501 also functions (operates) as the compound noun extraction unit 108. Meanwhile, the RAM, the auxiliary storage apparatus 1503, and the like of the main storage apparatus 1502 functions as the storing unit, the estimation result holding unit 103B in the parallel-translation dictionary creating apparatus 1 that store the parallel-translation word list 103D, the semantic-classification-based corpus 111, the parallel-translation dictionary 112, and the like.

Meanwhile, the computer 15 that is made to operate as the parallel-translation dictionary creating apparatus 1 does not have to include all the elements 1501-1508 illustrated in FIG. 26, and some of the elements may be omitted according to the purpose and conditions. For example, the computer 15 may be one in which the medium driving apparatus 1508 is omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parallel-translation dictionary creating apparatus comprising:
   a memory configured to store a parallel-translation word list in which one or more word pairs for which a parallel translation relationship across a plurality of languages has been confirmed and a semantic classification of a word; and
   a processor connected to the memory and configured to create a parallel-translation dictionary in which the parallel translation relationship for words across the plurality of languages is registered, based on a plurality of documents that are written in the plurality of languages and which contain a corresponding subject matter, the parallel-translation word list, and the semantic classification of words, wherein
   the processor executes processes including:
      performing a morphological analysis with respect to each of a plurality of documents that are written in a plurality of languages and which contain a corresponding subject matter, and extracting words from each of the plurality of documents;
      with respect to each of the plurality of documents, performing an estimation of the semantic classification of the extracted words and making the memory store the semantic classification of the word;
      based on a result of the estimation of the semantic classification for the word in a target document that is a current processing target and the one or more word pairs registered in the parallel-translation word list, performing an update for updating, to the semantic classification of the word for which the semantic classification has been estimated, the semantic classification of a corresponding word that corresponds to the word for which the semantic classification has been estimated and that is in a document of another language which contains a subject matter that corresponds to a subject matter of the target document that is the current processing target;
      controlling the estimation of the semantic classification of the word and the update of the semantic classification of the corresponding word;
      creating the parallel-translation dictionary based on the semantic classification of the word obtained by the estimation of the semantic classification of the word and the update of the semantic classification of the corresponding word;
      receiving a document to be translated from a terminal device;
      utilizing the created parallel-translation dictionary to translate the document; and
      outputting the translated document to the terminal device.

2. The parallel-translation dictionary creating apparatus according to claim 1, wherein
   in the process of performing the update of the semantic classification of the corresponding word,
      the semantic classification of a corresponding word that corresponds to the word for which the semantic classification has been estimated and that is in a document of other language which contains the subject matter that corresponds to the subject matter of the document that is a current processing target, and the semantic classification of the word that is in the document of the other language and that is the same as the semantic classification of the corresponding word are updated to the semantic classification of the word in the document that is the current processing target.

3. The parallel-translation dictionary creating apparatus according to claim 1, wherein
   the processor further executes a process including:
      referring to an existing parallel-translation dictionary that is different from the parallel-translation dictionary that is stored in the memory and in which the parallel translation relationship for words across the plurality of languages is registered, and according to statistics including a frequency of appearance in the plurality of documents with respect to parallel-translatio words registered in the existing parallel-translation dictionary and an ambiguity in the parallel-translation words, creating the parallel-translation word list that includes the parallel-translation words extracted from the existing parallel-translation dictionary.

4. The parallel-translation dictionary creating apparatus according to claim 1, wherein
   the process of creating the parallel-translation dictionary includes:
      performing a calculation of a value that represents a likelihood of being parallel-translation words with respect to a word pair that have a parallel translation relationship across a plurality of languages, according to the result of estimation of the semantic classification of the words extracted from the plurality of documents; and
      registering, in the parallel-translation dictionary, a word pair for which the value that represents the likelihood of being parallel-translation words is equal to or higher than a prescribed threshold.

5. The parallel-translation dictionary creating apparatus according to claim 4, wherein
the processor further performs a process including:
performing a creation of the parallel-translation word list in which the word pair for which the value that represents the likelihood of being parallel-translation words is equal to or higher than the prescribed threshold is registered.

6. The parallel-translation dictionary creating apparatus according to claim 5, wherein
the controlling of the estimation of the semantic classification of the word and update of the semantic classification of the word includes:
controlling for repeating, a prescribed number of times, the estimating of the semantic classification and the updating of the semantic classification, the calculating of the value that represents the likelihood of being parallel translation words, and the creating of the parallel-translation word list.

7. The parallel-translation dictionary creating apparatus according to claim 1, wherein
the processor further performs a process including:
according to an arrangement order of the words that are plural and extracted from one of the documents among the plurality of the documents, extracting a set of the words that are plural and consecutive and that satisfy a condition of a compound noun, and making the set of the plurality of words into a single word.

8. A parallel-translation dictionary creation method comprising:
by a computer, performing a morphological analysis with respect to each of a plurality of documents that are written in a plurality of languages and which contain a corresponding subject matter and extracting words from each of the plurality of documents;
by the computer, repeating a plurality of times a process of performing an estimation and storage of a semantic classification of the extracted words with respect to each of the plurality of documents, and based on a result of the estimation of the semantic classification for the word in a target document that is a current processing target and one or more word pairs that are registered in a parallel-translation word list and for which a parallel translation relationship across the plurality of languages has been confirmed, performing an update for updating, to the semantic classification of the word for which the semantic classification has been estimated, the semantic classification of a corresponding word that corresponds to the word for which the semantic classification has been estimated and that is in a document of another language which contains the subject matter that corresponds to the subject matter of the target document that is the current processing target;
by the computer, creating a parallel-translation dictionary in which a parallel translation relationship for words across the plurality of languages is registered, based on the semantic classification of the word obtained by the process of performing the estimation of the semantic classification of the word and the process of performing the update of the semantic classification;
receiving, by the computer, a document to be translated from a terminal device;
utilizing, by the computer, the created parallel-translation dictionary to translate the document; and outputting, by the computer, the translated document to the terminal device.

9. The parallel-translation dictionary creating method according to claim 8, wherein
in the process of performing the update of the semantic classification,
by the computer, the semantic classification of a corresponding word that corresponds to the word for which the semantic classification has been estimated and that is in a document of other language which contains the subject matter that corresponds to the subject matter of contents of the document that is a current processing target, and the semantic classification of a word that is in the document of the other language and that is the same as the semantic classification of the corresponding word are updated to the semantic classification of the word in the document that is the current processing target.

10. The parallel-translation dictionary creating method according to claim 8, the method further comprising:
by the computer, referring to an existing parallel-translation dictionary that is different from the parallel-translation dictionary and in which the parallel translation relationship for words across the plurality of languages is registered; and
by the computer, according to statistics including a frequency of appearance in the plurality of documents with respect to parallel-translation words registered in the existing parallel-translation dictionary and ambiguity in the parallel-translation words, creating the parallel-translation word list that includes the parallel-translation words extracted from the existing parallel-translation dictionary.

11. The parallel-translation dictionary creating method according to claim 8, wherein
in the process of creating the parallel-translation dictionary,
by the computer, a calculation of a value that represents a likelihood of being parallel-translation words with respect to a word pair that have a parallel translation relationship across a plurality of languages is performed, according to the result of estimation of the semantic classification of the words extracted from the plurality of documents, and a word pair for which the value that represents the likelihood of being parallel-translation words is registered in the parallel-translation dictionary.

12. The parallel-translation dictionary creating method according to claim 11, the method further comprising:
by the computer, performing a creation of the parallel-translation word list in which the word pair for which the value that represents the likelihood of being parallel-translation words is equal to or higher than a prescribed threshold is registered.

13. The parallel-translation dictionary creating method according to claim 12, wherein
by the computer, a series of processes comprising the estimation of the semantic classification and the update of the semantic classification, the calculation of the value that represents the likelihood of being parallel translation words, and the creation of the parallel-translation word list are repeated a plurality of times.

14. The parallel-translation dictionary creating method according to claim 8, the method further comprising:
by the computer, according to an arrangement order of the words that are plural and extracted from one of the documents among the plurality of the documents, extracting a set of the words that are plural and consecutive and that satisfy a condition of a compound noun, and making the set of the plurality of words into a single word.

15. A non-transitory computer-readable recording medium having stored therein a program that causes a computer to execute a process for creating a parallel-translation dictionary in which a parallel translation relationship for words across a plurality of languages is registered, the process comprising:
 performing a morphological analysis with respect to each of a plurality of documents that are written in a plurality of languages and which contain a corresponding subject matter and extracting words from each of the plurality of documents;
 repeating a plurality of times a process of performing an estimation and storage of a semantic classification of the extracted words with respect to each of the plurality of documents, and based on a result of the estimation of the semantic classification for the word in a target document that is a current processing target and one or more word pairs that are registered in a parallel-translation word list and for which a parallel translation relationship across the plurality of languages has been confirmed, performing an update for updating, to the semantic classification of the word for which the semantic classification has been estimated, the semantic classification of a corresponding word that corresponds to the word for which the semantic classification has been estimated and that is in a document of another language which contains the subject matter that corresponds to the subject matter of the target document that is the current processing target;
 creating a parallel-translation dictionary in which a parallel translation relationship for words across the plurality of languages is registered, based on the semantic classification of the word obtained by the process of performing the estimation of the semantic classification of the word and the process of performing the update of the semantic classification;
 receiving a document to be translated from a terminal device;
 utilizing the created parallel-translation dictionary to translate the document; and
 outputting the translated document to the terminal device.

16. The non-transitory computer-readable recording medium according to claim 15, wherein
 in the process of performing the update of the semantic classification,
 the semantic classification of a corresponding word that corresponds to the word for which the semantic classification has been estimated and that is in a document of other language which contains the subject matter that corresponds to the subject matter of the target document that is the current processing target, and the semantic classification of a word that is in the document of the other language and that is the same as the semantic classification of the corresponding word are updated to the semantic classification of the word in the document that is the current processing target.

* * * * *